United States Patent
Baynes et al.

(10) Patent No.: US 9,881,470 B2
(45) Date of Patent: Jan. 30, 2018

(54) AUTOMATED CROWDSOURCED POWER OUTAGE IDENTIFICATION AND STAGGERING OF HVAC SYSTEM RESTARTS

(71) Applicant: Google Inc., Mountain View, CA (US)

(72) Inventors: Andrew Baynes, Mountain View, CA (US); Scott McGaraghan, Menlo Park, CA (US); Anthony M. Fadell, Portola Valley, CA (US); David Sloo, Menlo Park, CA (US)

(73) Assignee: Google Inc., Mountain View, CA (US)

(*) Notice: Subject to any disclaimer, the term of this patent is extended or adjusted under 35 U.S.C. 154(b) by 605 days.

(21) Appl. No.: 14/508,167

(22) Filed: Oct. 7, 2014

(65) Prior Publication Data

US 2015/0100166 A1    Apr. 9, 2015

Related U.S. Application Data

(60) Provisional application No. 61/887,963, filed on Oct. 7, 2013.

(51) Int. Cl.
*G05F 1/66* (2006.01)
*G08B 13/06* (2006.01)
(Continued)

(52) U.S. Cl.
CPC .......... *G08B 13/06* (2013.01); *F24F 11/0009* (2013.01); *G05B 15/02* (2013.01); *G05F 1/66* (2013.01); *G08B 29/04* (2013.01); *H04L 12/2803* (2013.01); *H04L 12/2825* (2013.01); *H04N 21/4227* (2013.01);
(Continued)

(58) Field of Classification Search
CPC ................. F24F 11/0009; G05B 15/02; G05B 2219/2642; G05F 1/66; H04L 12/2803; H04L 2012/2841; H04L 12/2825; H04N 21/42202; H04N 21/4227; H04N 21/43615; H04N 21/42221; G08B 13/06; G08B 29/04
See application file for complete search history.

(56) References Cited

U.S. PATENT DOCUMENTS 5,216,897 A    6/1993    Tsuchiyama
5,684,710 A    11/1997    Ehlers et al.
(Continued)

OTHER PUBLICATIONS

International Search Report and Written Opinion dated Jan. 13, 2015 for International Patent Application No. PCT/US2014/059520 filed Oct. 7, 2014, 22 pages.
(Continued)

*Primary Examiner* — Van Nguyen
(74) *Attorney, Agent, or Firm* — Kilpatrick Townsend & Stockton LLP

(57) ABSTRACT

Various embodiments involving a smart-home device are presented. It may be determined that the power supply interface has ceased receiving power from the structure's wired electrical system. In response to determining that a power supply interface of the smart-home device has ceased receiving power from a structure's wired electrical system, a power loss indication may be stored that comprises a timestamp. A network connection may be determined to be available. A notification may be transmitted of information from the stored power loss indication to a remote server via the available network connection.

17 Claims, 12 Drawing Sheets

(51) Int. Cl.
      *G08B 29/04*     (2006.01)
      *F24F 11/00*     (2006.01)
      *G05B 15/02*     (2006.01)
      *H04L 12/28*     (2006.01)
      *H04N 21/422*    (2011.01)
      *H04N 21/4227*   (2011.01)
      *H04N 21/436*    (2011.01)

(52) U.S. Cl.
     CPC . *H04N 21/42202* (2013.01); *H04N 21/42221* (2013.01); *H04N 21/43615* (2013.01); *G05B 2219/2642* (2013.01); *H04L 2012/2841* (2013.01)

(56) References Cited

U.S. PATENT DOCUMENTS

| | | |
|---|---|---|
| 6,216,479 B1 | 4/2001 | Elwood |
| 8,539,567 B1 | 9/2013 | Logue et al. |
| 2004/0049321 A1 | 3/2004 | Lehr et al. |
| 2004/0113757 A1 | 6/2004 | White, II et al. |
| 2009/0030927 A1 | 1/2009 | Cases et al. |
| 2010/0298988 A1 | 11/2010 | Stachler et al. |
| 2012/0109545 A1 | 5/2012 | Meynardi et al. |

OTHER PUBLICATIONS

International Preliminary Report on Patentability dated Apr. 21, 2016, for International Patent Application No. PCT/US2014/059520, 10 pages.

AUTOMATED CROWDSOURCED POWER OUTAGE IDENTIFICATION AND STAGGERING OF HVAC SYSTEM RESTARTS

CROSS REFERENCES

This application claims priority to U.S. Provisional Application No. 61/887,963, filed Oct. 7, 2013, which is hereby incorporated by reference for all purposes.

BACKGROUND

In many cases, a utility service provider may learn of a power outage by customers calling to complain that their structures (e.g., houses, townhomes, stores, apartment, etc.) have lost power. Ordinarily, there may be a time delay between when a power outage begins and when a customer alerts the power company for many reasons. For example, the customer may be hopeful that someone else will make the call to the utility provider instead, the power outage will be temporary and will resolve itself quickly, or the customer may not be present at the structure that has lost power (or may be asleep or otherwise oblivious to the structure) and may be as yet unaware that power has been lost. For a utility provider to remedy a power outage, the utility provider may first need to be aware of the outage and may need to be convinced that the problem is due to the provider's distribution system and not a problem with a particular structure's electrical system. Therefore, the sooner the utility provider is made aware of the power outage and is made aware that the outage is not particular to a single structure (e.g., a problem with a particular structure's electrical system), the sooner the utility provider may take measures to remedy the power outage.

FIELD

This patent specification relates to systems, devices, methods, and related computer program products for smart buildings including the smart home. More particularly, this patent specification relates to detection units, such as smart thermostats, hazard detection units (e.g., smoke detectors, carbon monoxide sensors, etc.) or other monitoring devices, that are useful in smart building and smart home environments.

SUMMARY

Various systems, methods, devices, and processor-readable mediums are presented for determining when a power outage has occurred in a structure and reporting such power outages to a remote server system. The remote server system may determine, based on information from multiple devices, where a power outage has occurred. The server may inform a utility provider of the outage. The server may also schedule a staggered restart of electrical heating, ventilation, and air conditioning systems for when the power outage ends.

In some embodiments, a smart-home device is presented. The device may include a power supply interface that receives power from a structure's wired electrical system. The device may include a battery-based power supply configured to charge, using the power supply interface and provide power to the smart-home device when the structure's wired electrical system is not powered. The device may include a processing system. The processing system may determine that the power supply interface has ceased receiving power from the structure's wired electrical system. The processing system may in response to determining that the power supply interface has ceased receiving power from the structure's wired electrical system, store a power loss indication that comprises a timestamp. The processing system may determine that a network connection is available. The processing system may transmit a notification comprising information from the stored power loss indication to a remote server via the available network connection.

Embodiments of such a device may include one or more of the following features: The smart-home device may be located in a first structure and the processing system being configured to determine that the network connection is available may include the processing system being configured to query a second smart-home device located in a second structure distinct from the first structure. The processing system may, in response to the query, receive an indication that the second smart-home device located in the separate structure has the available network connection. The smart-home device may be a thermostat and the second smart-home device may be a smoke detector. The processing system being configured to determine that the network connection is available may include the processing system being configured to establish a wireless connection with a cellular phone that is connected with a cellular network. The device may include at least one temperature sensor, wherein the smart-home device is a thermostat that controls an HVAC system.

The processing system may be configured to receive an indication from a second smart-home device indicative of a power loss at the second smart-home device. The processing system being configured to store the power loss indication that includes the timestamp may include the processing system being configured to store the power loss indication that comprises the timestamp in response to determining that the power supply interface has ceased receiving power from the structure's wired electrical system and the indication from the second smart-home device indicative of the power loss at the second smart-home device. The processing system may be configured to determine artificial lighting in an ambient environment of the smart-home device has transitioned from on to off within a threshold time period of the power supply interface having ceased to receive power from the structure's wired electrical system. The processing system being configured to store the power loss indication that comprises the timestamp comprises the processing system may include the processing system being configured to store the power loss indication that comprises the timestamp in response to determining that the power supply interface has ceased receiving power from the structure's wired electrical system and the determining the artificial lighting in the ambient environment of the smart-home device has transitioned from on to off. The processing system may be configured to determine that the power supply interface has ceased receiving power from the structure's wired electrical system for at least a threshold period of time. The processing system being configured to store the power loss indication that comprises the timestamp may include the processing system being configured to store the power loss indication that comprises the timestamp in response to determining that the power supply interface has ceased receiving power from the structure's wired electrical system for at least the threshold period of time.

In some embodiments, a smart-home device data aggregation system is presented. The system may include one or more processors. The system may include a memory communicatively coupled with and readable by the one or more processors and having stored therein processor-readable instructions. The instructions, when executed by the one or more processors, cause the one or more processors to receive a plurality of power loss notifications from a plurality of smart-home devices, wherein each smart-home device of the plurality of smart-home devices is located in a different structure and the plurality of power loss notifications comprises a plurality of timestamps corresponding to times at which power loss was detected by the plurality of smart-home devices. The one or more processor may be configured to identify a plurality of locations corresponding to the plurality of smart-home devices from which the plurality of power loss notifications were received. The one or more processor may be configured to identify a power outage cluster based on the plurality of locations and the plurality of timestamps. The one or more processor may be configured to determine a utility service provider associated with a geographic region of the power outage cluster. The one or more processor may be configured to transmit a notification to the utility service provider indicative of a power outage and the geographic region of the power outage cluster.

Embodiments of such a server system may include one or more of the following features: The processor-readable instructions that cause the one or more processors to identify the power outage cluster based on the plurality of locations and the plurality of timestamps may include processor-readable instructions that, when executed, cause the one or more processors to determine the power outage cluster using a threshold time difference and a threshold distance difference for determining whether the plurality of power loss notifications are associated with a power loss event. The processor-readable instructions that cause the one or more processors to identify the power outage cluster based on the plurality of locations and the plurality of timestamps may include processor-readable instructions that, when executed, cause the one or more processors to analyze an electrical grid mapping to determine the plurality of smart-home devices are connected with a common electrical grid. The one or more processors may be configured to create a schedule for reinitiating electrical HVAC functions for the plurality of smart-home devices, wherein the schedule defines staggered start times for electrical HVAC functions for the plurality of smart-home devices. The one or more processors may be configured to transmit, to each smart-home device of the plurality of smart-home devices, a timing indication at which electrical HVAC functions are eligible to be reinitiated. The plurality of smart-home devices, each smart-home device may be configured to: receive the timing indication at which an electrical HVAC system is eligible to be reinitiated; and restart the electrical HVAC system based on the timing indication. The electrical HVAC system may be either an electric heating source or an air conditioner. The one or more processors may be configured to collect social media data indicative of a power outage. The one or more processors may be configured to identify a location associated with the social media data. The processor-readable instructions that cause the one or more processors to identify the power outage cluster based on the plurality of locations and the plurality of timestamps may include processor-readable instructions that, when executed, cause the one or more processors to identify the power outage cluster based on the plurality of locations, the plurality of timestamps, and the location associated with the social media data.

In some embodiments, a method for handling a power outage is presented. The method may include determining, by a smart-home device, that a power supply interface of the smart-home device has ceased receiving power from a structure's wired electrical system. The method may include storing, by the smart-home device a power loss indication that comprises a timestamp in response to determining that the power supply interface has ceased receiving power from the structure's wired electrical system. The method may include determining, by the smart-home device, that a network connection is available. The method may include transmitting, by the smart-home device, a notification comprising information from the stored power loss indication to a remote server via the available network connection.

In some embodiments, an apparatus for handling a power outage is presented. The apparatus may include means for determining that a power supply interface of the smart-home device has ceased receiving power from a structure's wired electrical system. The apparatus may include means for storing a power loss indication that comprises a timestamp in response to determining that the power supply interface has ceased receiving power from the structure's wired electrical system. The apparatus may include means for determining that a network connection is available. The apparatus may include means for transmitting a notification comprising information from the stored power loss indication to a remote server via the available network connection.

DETAILED DESCRIPTION

Figure 1:
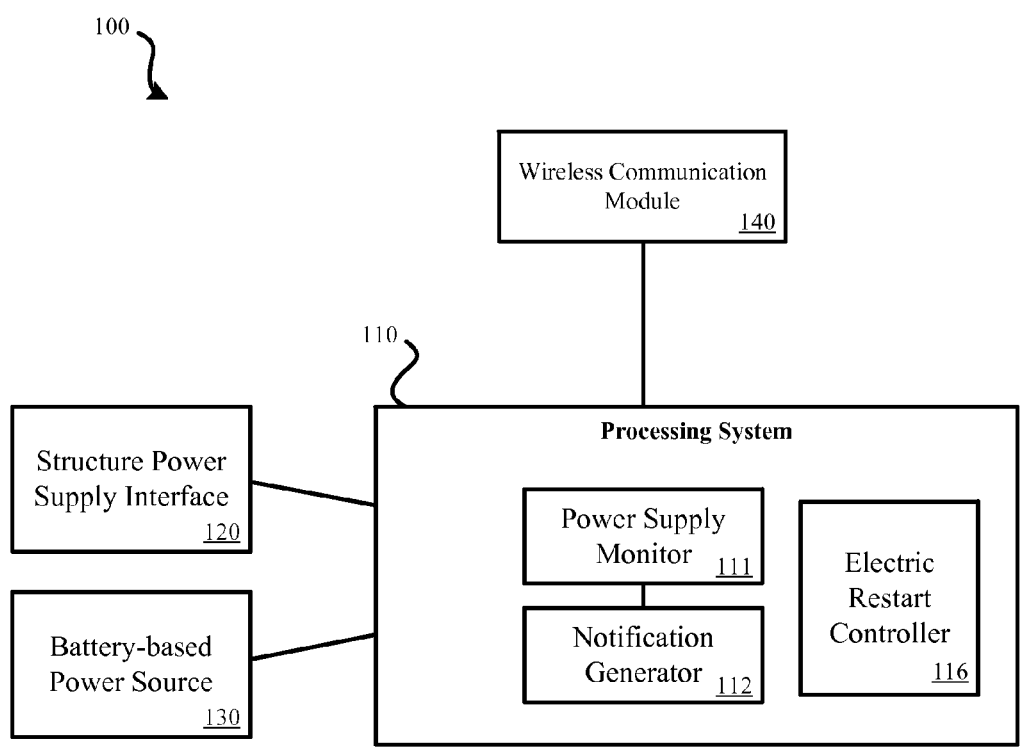
FIG. 1 illustrates an embodiment of a smart-home device that monitors for and reports power outages.

A utility service provider's responsiveness to power failures may be expedited by the utility service provider receiving reliable power outage information aggregated from various sources, such as a plurality of smart-home devices. Smart-home devices, which are becoming increasingly common in households, can include smart thermostats and smart hazard detectors (e.g., smoke and/or carbon monoxide detectors) that are connected to the Internet via a structure's wireless network. While this document refers frequently to applications involving houses and homes, it should be understood that embodiments may be applicable to various other forms of structures also, such as buildings, offices, warehouses, stores, etc.

A power outage may be detected by a smart-home device by detecting that a household's wired AC power source has become unavailable. When a power outage is initially detected by a smart-home device, the smart-home device may confirm that a power loss has actually occurred by performing at least one confirmation action, such as by (requesting and) receiving a power loss indication from another smart-home device, detecting lights going out in the ambient environment of the smart-home device substantially concurrently with the power loss being detected, user input indicative of the power loss being received, and/or waiting at least a threshold period to see if power is restored, etc. If the power loss is confirmed, a power loss notification may be sent to a remote aggregation server system, which may be maintained by a provider of the smart-home device or a third party service provider. Such a notification may be transmitted to the aggregation server system via a local wireless network and Internet connection, if available; if not, the smart-home device may make various other attempts to connect with the Internet, such as via a wireless device (e.g., cellular phone) or by communicating with a smart-home device in another structure that has access to the Internet.

The aggregation server system may receive the power loss notification from the smart-home device, and, likely, if the power outage is fairly widespread, from some number of other smart-home devices located in nearby structures that are also affected by the power outage. The aggregation server system may aggregate and analyze these notifications to determine a cluster that can likely be attributed to a common power outage event. Such a cluster may vary in size; for instance, a cluster may involve several homes or thousands of homes depending on how widespread the power outage is. Such an analysis may involve comparing the locations of the power outage notifications to a mapping of a utility provider's electrical grids to determine which smart-home devices receive power from a common electrical grid. Once the aggregation server system has identified a power outage cluster, one or more notifications may be sent to the appropriate utility company, which may then take appropriate measures to remedy the power outage.

In response to a power outage being detected, the aggregation server system may create a schedule to restart electrical HVAC systems associated with at least the smart-home devices from which the power outage notifications were received. The schedule may be intended to reduce an initial load on the electrical grid when power is restored. For instance, if it is a hot day and power has been out for more than a few minutes, a large number of structures may trigger air conditioners to turn on as soon as power is restored. Many large electrical appliances, such as air conditioners, turning on at substantially a same time may create a significant load on an electrical grid, potentially triggering additional electrical grid failures. By staggering the reinitialization (that is, turning on for the first time following power being restored) of at least some electrical appliances, stress on the electrical grid may be reduced. Each smart-home device that controls electrical appliances, such as a smart thermostat that controls one or more electrical HVAC systems (e.g., electric furnace, baseboard heaters, central air conditioning unit), may receive an indication of an amount of time that the smart-home device is to wait before restarting the electrical HVAC system following power being restored. The features and advantages of the present invention are enhanced by the fact that certain smart, network-connected, remotely controllable, and remotely software-updatable thermostats, such as the Nest® Learning Thermostat, have become popular with consumers and have become pervasive throughout many communities, the popularity being fueled by infectious consumer desire that is not unlike consumer desire for the newest and coolest personal electronic devices such as smartphones. Depending, of course, on location, pricing, and governmental and utility programs, this kind of growth and dynamism is not always equally exhibited in the field of residential smart meters, and there can be substantial differences in capability, connectivity, controllability, and other realities associated with remote monitoring and ON/OFF control of substantial populations of smart-meters. In contrast, the features and advantages of the present invention can be readily implemented on a large scale for an already-installed base of smart, network-connected thermostats of similar type, by virtue of the ability to remotely update the operating software of the thermostats concurrently with programming changes at the central cloud server(s) into which the network-connected thermostat already report on a continuous basis. Especially for areas where air conditioning is pervasive, the thermostats are already connected to control what is usually the largest electrical load in the home, the air conditioning, which on hot days collectively becomes the culprit in many power outages and corresponding grid restart power surges. Thus, stated differently, one of the particularly advantageous aspects of the present invention, when applied in the particular context of certain smart, network-connected, remotely controllable, and remotely software-updatable thermostats, is that it represents a "plug and play" solution that can be implemented promptly via software update to a physical infrastructure that is already in place. It is to be appreciated, however, that while network-connected thermostats such as the Nest® Learning Thermostat represent particularly advantageous embodiments, the present invention is not so limited and can be implemented, in alternative embodiments, using several types of network-connected controllers that control substantial electrical loads.

Social media may be leveraged to increase the speed at which utility service providers are alerted about power outages and/or to gather more accurate data on a cluster of structures that have lost power. An aggregation server system may monitor social media. For instance, when a user registers an installed smart-home device with a service provider of the smart-home device, the user may be prompted for social media information, such as a Twitter® username. Keywords, such as "power," "loss," and/or the utility provider's name may be monitored for in the user's social media feed. When such a social media post is detected, the aggregation server system may determine a time and location associated with the post and use this data to augment (or in place of) power loss data received from smart-home devices. For instance, a user may be able to post to social media via a cellular phone, but a smart-home device may not be able to send a power outage notification to the aggregation server system if the wireless network and/or the internet connection of the structure in which the smart-home device is installed is not connected with an uninterruptable power supply (UPS). Therefore, a social media post that mentions a power failure in combination with an uncommunicative smart-home device may be indicative of a power failure at the structure in which the smart-home device is installed.

FIG. 1 illustrates an embodiment of a smart-home device 100 that monitors for and reports power outages. Smart-home device 100 may represent various forms of smart-home devices, such as a smart thermostat or a smart hazard detector. Further types of smart-home devices are described in relation to FIG. 9. Smart-home device 100 may include: processing system 110, structure power supply interface 120, battery-based power source 130, and wireless communication module 140. For example, each of such components may be contained within the smart-home device, such as within the body of a smart thermostat that is connected with a household's HVAC system.

Structure power supply interface 120 may be either directly or indirectly connected with a household's wired electrical system. For example, structure power supply interface 120 may be connected directly to a household's 120 V (or 240 V) AC (alternating current) electrical system. In some embodiments, structure power supply interface 120 may be connected with a voltage source (e.g., 24 V) created by a transformer that is connected with a household's AC electrical system. The structure's AC power supply may be received from a utility service provider via an electrical grid. Therefore, a problem with the electrical grid may cause a household's electrical system to cease providing power to structure power supply interface 120. Structure supply interface 120 may be configured to supply power to components of smart-home device 100 when the structure's power supply is available. Therefore, under normal operating conditions, power may be delivered to components such as processing system 110 from a structure's power supply via structure power supply interface 120. For example, if the smart-home device is a thermostat, structure power supply interface 120 may be wired into the structure's HVAC control system, which is used to control one or more HVAC systems within the structure and may be used to supply power to a smart thermostat. Structure power supply interface 120 may be capable of determining when the structure's electrical system is unavailable. Alternatively, via structure power supply interface 120, processing system 110 may determine when the structure's electrical system is unavailable.

Battery-based power source 130 may represent one or more batteries, one or more capacitors, or other form of power storage device of smart-home device 100. Battery-based power source 130 may be charged from power derived from structure power supply interface 120 when the structure's electrical system is functioning. When the structure's electrical system is not available, power for use by smart-home device 100 may be drawn from battery-based power source 130. Therefore, battery-based power source 130 may serve as a power backup for power derived from structure power supply interface 120. Accordingly, if a structure's electrical system fails (e.g., due to an electrical grid problem), smart-home device 100 may continue operating until power stored by battery-based power source 130 has been depleted.

Processing system 110 may represent one or more processors and non-transitory computer-readable mediums that are configured to perform various functions, including reporting power failures to a remote system and/or restarting electrical HVAC systems based on one or more received commands from the remote system. Processing system 110 may be understood as having various modules, including: power supply monitor 111, notification generator 112, and electric restart controller 116. While processing system 110 is illustrated as having modules directed towards only power outage reporting and reinitialization, it should be understood that the smart-home device may contain multiple other modules directed to functionality specific to various home automation functions. For instance, if smart-home device 100 is a smart thermostat, processing system 110 may have various modules for controlling temperature within the structure. Modules of processing system 110 may represent hardware, firmware, or software being executed by underlying hardware. Therefore, for instance, one or more processors of processing system 110 may be configured using software to perform the functions of power supply monitor 111, notification generator 112, and electric restart controller 116.

Power supply monitor 111 may be configured to either receive an indication from structure power supply interface 120 that the structure's electrical system has become unavailable or may determine via structure power supply interface 120 that the structure's electrical system is unavailable. In some embodiments, this determination may be sufficient for power supply monitor 111 to determine that a notification should be transmitted to a remote system, such as an aggregation server system detailed in relation to FIG. 4, to indicate that a power loss has occurred. In other embodiments, power supply monitor 111 may perform one or more additional steps to verify whether the structure's electrical system has truly become unavailable, such as detailed in relation to blocks 509 of method 500 of FIG. 5. Such actions may be desirable because various local causes of power loss to smart-home device 100 may result in the appearance of an electrical outage to smart-home device 100. For instance, if structure power supply interface 120 is plugged into an electrical outlet, a user may have unplugged smart-home device 100 from the electrical outlet (which, if no confirmation is performed, could be interpreted as a power outage to smart-home device 100). As another example, a fuse at a breaker box may have been tripped for a circuit connected with smart-home device 100, thus interrupting power to smart-home device 100, but not to other circuits of the structure.

When power supply monitor 111 has determined that a power outage has occurred, power supply monitor 111 may provide an indication of the power outage to notification generator 112. Notification generator 112 may formulate a message to be transmitted to an aggregation server system that is indicative of smart-home device 100 experiencing a power outage. The notification generated by notification generator 112 may include: a timestamp that indicates when the power outage was detected, an indication of how the power outage was confirmed by smart-home device 100, a location of smart-home device 100, an indication of a user account associated with smart-home device 100, an indication of a communication path used to communicate with the aggregation server system, and/or an indication of which HVAC systems rely on electricity to heat or cool (referred to as "electrical HVAC systems"). The notification created by notification generator 112 may be transmitted to the aggregation server system via wireless communication module 140.

Wireless communication module 140 may represent one or more than one interface that is configured to communicate wirelessly. Wireless communication module 140 may be configured to communicate with a local wireless network, such as one that operates using WiFi IEEE 802.11/a/b/g protocols. In some arrangements, wireless communication module 140 may communicate with a wireless router that is connected with the Internet. Wireless communication module 140 may communicate using various other protocols. One particularly useful protocol that can be used is the Thread protocol, which is promulgated by the Thread Group and based on 802.15.4, IETF IPv6, and 6LoWPAN. Various other wireless protocols may also be used, such as cellular, Zigbee, and BLE. Such protocols may be used to communicate directly or indirectly with various other smart-home devices, and/or other short range wireless protocols, such as Bluetooth® and WiFi Direct®. For instance, Bluetooth® or WiFi Direct® may be used to communicate with a cellular phone located within the same structure as smart-home device 100. If structures are located substantially near each other, wireless communication module 140 may be able to communicate with smart-home devices located in other structures.

Wireless communication module 140 may be configured to transmit a notification created by notification generator 112. Wireless communication module 140 may also be configured to receive messages from remote computer systems, such as an aggregation server system. An aggregation server system may provide a message to processing system 110 that indicates when one or more electric HVAC systems controlled by smart-home device 100 are to be reinitiated following power being restored. Since such a message may be sent by an aggregation server system when the aggregation server system has no information as to when power may be restored, the schedule may indicate an amount of time after the power is restored that such electrical HVAC systems should be reinitiated by smart-home device 100. For instance, an indication of three minutes may be received in such a message.

Electric restart controller 116 may use such scheduling information to control when smart-home device 100 reinitiates one or more electrical HVAC systems controlled by smart-home device 100. Electric restart controller 116 may store information that indicates which HVAC systems are electrical. For instance, for a particular structure, a heating source may or may not be electrical. For example, an electric heater, which is typically used in electric baseboards, represents a type of electrical HVAC system, as does an air-conditioning system, which is powered by electricity. Oil or gas burning furnaces, even though such furnaces may have an electric fan/blower, may not be considered electrical HVAC systems. In other embodiments, such an electric fan/blower may be considered a form of electrical HVAC system. Nonelectrical HVAC systems may be reinitiated irrespective of any message from an aggregation server system. When either power supply monitor 111 or structure power supply interface 120 detects that structural power has again become available, electric restart controller 116 may begin monitoring an amount of time that has elapsed since power has been restored. Once the period of time indicated in the message received from the aggregation server system has been reached, the electrical HVAC systems controlled by smart-home device 100 become eligible for being turned on. The electrical HVAC system may not necessarily be turned on if the temperature within the structure is still consistent with a temperature set point controlled by smart-home device 100 (e.g., the temperature within the structure is at or below the set point temperature if air conditioning is enabled, or is at or above the set point temperature if heating is enabled).

Figure 2:
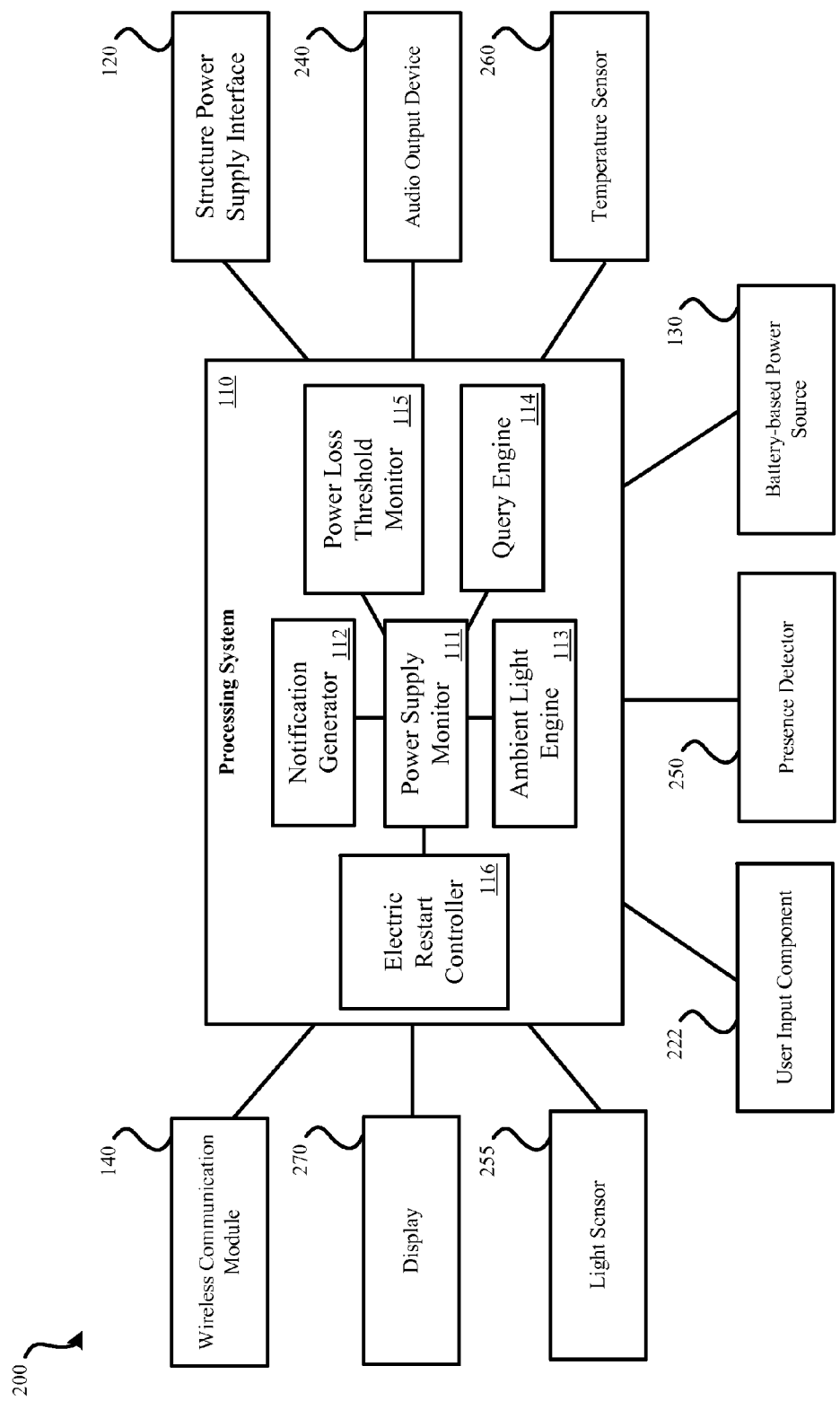
FIG. 2 illustrates an embodiment of a smart thermostat that monitors for and reports power outages.

FIG. 2 illustrates an embodiment of a smart thermostat 200 that monitors for and reports power outages. While smart-home device could be a thermostat, smoke/carbon monoxide detector, or some other type of smart-home device, FIG. 2 represents a smart thermostat 200 that controls at least one electrical HVAC system. Thermostat 200 can represent a more detailed embodiment of smart-home device 100 that includes a greater number of components and modules. In thermostat 200, various components may be present including: processing system 110, light sensor 255, battery-based power source 130, wireless communication module 140, user input component 222, structure power supply interface 120, presence detector 250, audio output device 240, and temperature sensor 260. Wireless communication module 140, battery-based power source 130, and structure power supply interface 120 may function as detailed in relation to smart-home device 100 of FIG. 1.

Processing system 110 of thermostat 200 may include multiple submodules. Such submodules may be implemented using hardware, firmware, and/or software that is executed by underlying hardware, such as one or more processors. Such modules may include: power supply monitor 111, notification generator 112, ambient light engine 113, query engine 114, power loss threshold monitor 115, and electric restart controller 116. For instance, such modules may represent code that is executed by a high-level processor of thermostat 200. A low-level processor of thermostat 200 may be reserved for critical functions, such as temperature control.

Ambient light engine 113 may be used to determine, via light sensor 255, when artificial lighting in the vicinity of thermostat 200 has shut off. If power supply monitor 111 determines that structure power supply interface 120 has lost power at substantially a same time at which ambient light engine 113 has determined that artificial lighting in the vicinity of thermostat 200 has shut off, power supply monitor 111 may determine that a power outage has occurred. Ambient light engine 113 may monitor for specific wavelengths or flicker of light typically associated with artificial lighting. In other embodiments, ambient light engine 113 may determine that light is artificial based on the abruptness with which it was turned off. Further, the time of day may be used to distinguish between artificial and natural lighting (e.g., there is very little natural lighting at night).

Query engine 114 may be used to transmit a message via wireless communication module 142 to one or more other smart-home devices located within the same structure when power supply monitor 111 has detected (or been notified) of a potential power loss. A message transmitted by Query engine 114 may request a response indicative of whether the smart-home device to which the message was transmitted lost power. For instance, thermostat 200 may already be paired for communication with one or more smart hazard detectors installed within the same structure. Query engine 114 may receive a response to its query indicative of whether the one or more other smart-home devices have lost power. If no response is received, such as from a smart-home device that does not have battery backup system, it may be assumed that the smart-home device has lost power. In other embodiments, when power is lost by another smart-home device, a message may be transmitted to thermostat 200 indicative of power being lost without a query being generated by query engine 114 and transmitted.

In some embodiments, power loss threshold monitor 115 monitors an amount of time since power supply monitor 111 has indicated that a power loss may be in progress. A power outage may be considered to have occurred if the amount of time for which power has not been received via structure power supply interface 120 exceeds a predefined threshold amount of time. For example, power loss threshold monitor 115 may be used to determine if a power loss has lasted for longer than 10 minutes.

In addition to the functions previously described in relation to notification generator 112, notification generator 112 may be configured to transmit a message to one or more users indicative of the power loss. For instance, thermostat 200 may display a message on its display indicative of a possible power loss. A user may be requested to respond as to whether the power loss is likely due to a power outage via user input component 222. In other embodiments, an indication of the power loss may be transmitted to a remote server which may push a message to one or more devices associated with the user, such as a cellular phone indicative of the possible power outage. Such a message may request that the user confirm that such a power outage has in fact occurred, rather than thermostat 200 being, for example, disconnected from an outlet or other wired power source.

Notification generator 112 may also cause various other forms of messages to be presented to one or more users via display 270 of thermostat 200 and/or via one or more other user devices associated with the same user account as thermostat 200. For instance, notification generator 112 may be used to alert a user as to how long after a power outage electric restart controller 116 will start electrical HVAC systems controlled by thermostat 200. A user may be permitted to provide input, such as via wireless device or user input component 222 to override such a delayed reinitialization of the electrical HVAC systems.

Light sensor 255 detects the presence of light in the ambient environment of thermostat 200. Light sensor 255 may detect a brightness level in the ambient environment of thermostat 200. Such a brightness level may be affected by natural and artificial lighting. Light sensor 255 may provide an indication of the brightness level in the ambient environment of thermostat 200 to processing system 110. Light sensor 255 may be used by processing system 110 to determine if artificial light in the ambient environment of thermostat 200 shuts off at substantially a same time that thermostat 200 detected a power outage.

Presence detector 250 may detect a presence or motion within the ambient environment of thermostat 200. Presence detector 250 may include one or more passive infrared (PIR) sensors and/or ultrasonic sensors that receive infrared radiation (or reflected ultrasonic sound) from the ambient environment of the hazard detector. For instance, a user walking or otherwise moving in the vicinity of thermostat 200 emits infrared radiation which may be detected by presence detector 250. In other embodiments, presence detector 250 may use some other form of sensor than a PIR sensor. Presence detector 250 may provide an indication to processing system 110 of when motion is present in the ambient environment of thermostat 200. More generally, presence detector 250 may be a form of sensor that can detect a user's presence even if motionless. In some embodiments, presence detector 250 outputs raw data that is analyzed by processing system 110 to determine if motion is present or a user is otherwise present. In some embodiments, motion may be analyzed to determine if it likely corresponds to a person or is incidental (e.g., a pet, an object being warmed by sunlight, etc.).

User input component 222 may represent a component that receives input that can be passed to processing system 110. User input component 222 may take the form of a button or switch on thermostat 200. By depressing the button or otherwise actuating user input component 222, a user can provide input via user input component 222 to processing system 110. For instance, user input component 222 may be used by a user to provide input to thermostat 200 regarding whether a power outage appears to be occurring.

Audio output device 240 may represent a speaker or buzzer. Audio output device 240 may be capable of outputting synthesized or recorded speech, thus allowing spoken messages to be output to users in the vicinity of thermostat 200. Other sounds, such as an alarm buzzing or ringing may also be generated by audio output device 240. Audio output device 240 may include a piezo sound generator configured to generate a very loud alarm sound. For instance, if a power loss is detected, a sound may be made that is intended to solicit for user feedback via user input component 222 as to whether a power outage has actually occurred.

Temperature sensor 260 may be used by thermostat 200 to monitor the ambient temperature of thermostat 200. Temperature measurements made by temperature sensor 260 may be used in controlling whether electrical (and non-electrical) HVAC systems are turned on or off. Display 270 may represent a monochrome or multicolor display on the face of thermostat 200. Display 270 may be used to provide a user with information related to functions of the thermostat, such as a set point temperature and a current ambient temperature of thermostat 200. Display 270 may also be used to present messages related to power outages and reinitialization of electrical HVAC systems. For instance, if a power outage has been detected, display 270 may present a message indicative of the power outage. Display 270 may prompt a user to confirm whether such a power outage has in fact occurred. Status messages related to the PowerEdge may also be present, such as an estimated time at which the utility company believes power will be reinstated. If power has been restored but electrical HVAC systems controlled by thermostat 200 have not been restarted, display 270 may be used to present the message indicative of when such electrical HVAC systems will be eligible to be restarted, such as "The air conditioner is scheduled to be turned back on in three minutes and 51 seconds. Provide input now to override and restart the air conditioner now." Such a message may only be presented if the ambient temperature of thermostat 200 as compared with a set point temperature of the thermostat would normally result in the electrical HVAC system being turned on (e.g., the air conditioner being turned on because the ambient temperature is 80 degrees Fahrenheit while the set point temperature is 75 degrees Fahrenheit).

In some embodiments, thermostat 200 may be powered exclusively by batteries and may not have structure power supply interface 120. To determine power loss, processing system 110 may monitor for an electric HVAC system turning off unexpectedly or failing to turn on when expected. If the electric HVAC system turns off unexpectedly and this event occurs substantially contemporaneously with one or more artificial lights in the vicinity of thermostat 200 turning off (as detected by light sensor 255), processing system 110 may determine that a power loss has occurred.

Figure 3:
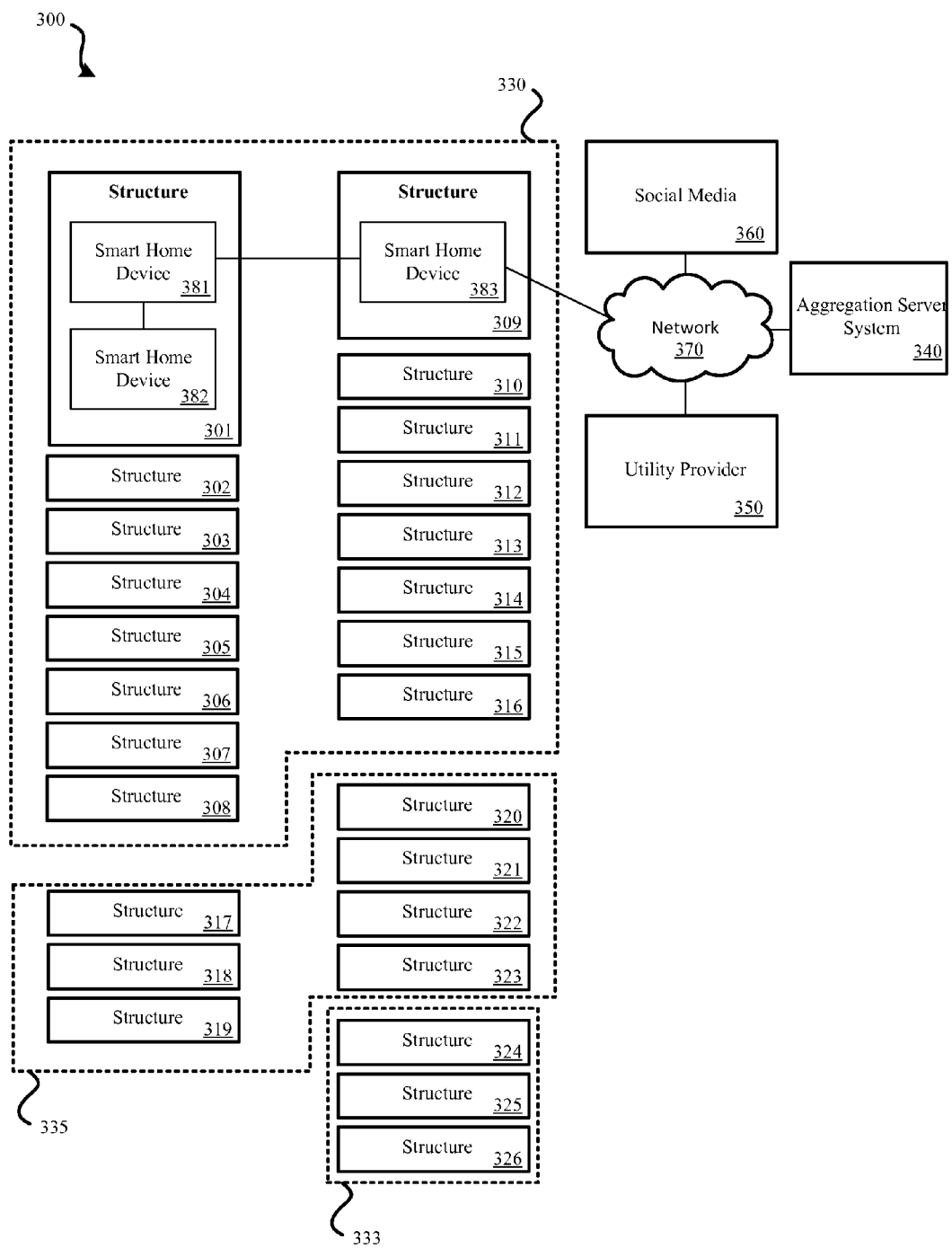
FIG. 3 illustrates an embodiment of a system of multiple smart-home devices that report data to an aggregation server system.

FIG. 3 illustrates an embodiment of a system 300 of multiple smart-home devices that report data to an aggregation server system. For instance, system 300 may represent a neighborhood having twenty-six structures (represented by structure 301 through structure 326). Structure 301 represents a structure, such as a home, having two smart-home devices: smart-home device 381 and smart-home device 382. Smart-home device 381 and smart-home device 282 may represent, for example, smart-home device 100 of FIG. 1 or thermostat 200 of FIG. 2. Smart-home device 381 may be in communication with smart-home device 382. For example, smart-home device 381 may represent a thermostat that is in communication with a hazard detector located within the same structure that is functioning as smart-home device 382. Smart-home device 381 may, when a power outage is not in progress, be able to communicate with the Internet.

Structure 309 may represent a home or other form of structure that has a single smart-home device present within it, represented as smart-home device 383. Smart-home device 383 may, when a power outage is or is not in progress, be able to communicate with the Internet via a local wireless network. For example, a network connection present in structure 309 may be connected to an uninterruptible power supply. Structures 302 through 308 and structures 310 through 326 may represent separate homes or other forms of structures that may or may not have smart-home devices installed within them. For instance, some of the structures may have smart-home devices that communicate with aggregation server system 340 while others may not. For simplicity, only two structures, structure 301 and structure 309, are illustrated as having one or more smart-home devices. It should be understood that all or some of structures 302 through 308 and structures 310 through 326 have one or more smart-home devices that, at least when power is present, can communicate with aggregation server system 340. In other embodiments, it is also possible that only structures 301 and 309 of the illustrated structures have smart-home devices that communicate with aggregation server system 340.

The structures of FIG. 3 may not all be part of the same electrical grid. For instance, based on how a utility provider has its electrical power distribution system set up, different structures may be connected with different substations of electrical distribution grid. Each electrical substation may be connected with its own electrical grid that distributes, for example, approximately 2 MW of power to various structures. Each electrical substation may be connected with a larger electrical distribution network that is connected to sources of power, such as power generation plants. While two structures may be very close in physical proximity, such as next-door to each other, it may be possible that these structures are connected with different electrical grids (that is, for example, connected with different substations). Therefore, a problem with one electrical grid (e.g., a downed wire) or equipment failure at the substation, may not affect a structure next-door that is connected with a different electrical grid that does not rely on the same electrical lines or equipment. FIG. 3 illustrates three electrical grids: electrical grid 330, electrical grid 333, and electrical grid 335. While structure 308 and structure 317 may be close in physical proximity, these two structures are part of separate electrical grids and, thus, may rely on different electrical lines, substations, electric distribution systems, or even power plants for electricity. Therefore, a power outage occurring at structure 308, for example, may not be indicative of a power outage likely occurring at structure 317. Alternatively, if a massive power outage is in progress, such as a problem with a large-scale electrical distribution system, it is possible that multiple electrical grids may be affected. Therefore, if, around the same time, a power outage is detected at one or more structures and electrical grid 330 and in electrical grid 335, it may be more likely that the power outage is also occurring at electrical grid 333 if all three electrical grids are connected with the same electrical distribution system.

For the remainder of the example of FIG. 3, it is assumed that a power outage has occurred that affects electrical grid 330 but not electrical grid 335 or electrical grid 333. When smart-home device 383 detects that a power outage has occurred, it may transmit an indication as previously described to aggregation server system 340 via network 370. Network 370 may represent the Internet. Smart-home device 383 may still be able to communicate with network 370 even though power via electrical grid 330 is not available due to some form of power backup for structure 309 being installed that protects at least the connection with network 370, such as a UPS. Aggregation server system 340 may receive the message from smart-home device 383 indicative of the power outage along with other information, which may indicate a time at which the power outage occurred, a user account associated with the smart-home device, a ZIP Code of structure 309, information on characteristics of the power outage (e.g., whether a power surge was detected before the power failed), etc.

Similar messages may be received by aggregation server system 340 from one or more other structures that are also connected with electrical grid 330. While structure 301 may typically have a connection to network 370, due to the power outage on electrical grid 330, devices within structure 301 cannot connect to the Internet. Therefore, using its ordinary communication route, smart-home device 381 may not be able to directly communicate with network 370. However, it may be possible for smart-home device 381 to communicate with some form of device located in another structure that does have a connection with network 370. For example smart-home device 381 may communicate with smart-home device 383 which is connected to network 370. Smart-home device 281 may then route a message to aggregation server system 340 through smart-home device 383. A message may also be provided to aggregation server system 340 at the route which the message from smart-home device 381 took. Such a route may be used in the future by aggregation server system 340 for sending a response or some other form of message to smart-home device 381 while the power outage on electrical grid 330 is still occurring. As another instance of an example where smart-home device-to-smart-home device communication may be useful, electrical grid 335 may not have lost power. Structure 317, for example, may be in close physical proximity to structure 308. A smart-home device installed in structure 308 may communicate with a smart-home device (or with some other form of device, such as a wireless router) present in structure 317. Via a connection with network 370 present in structure 317, the smart-home device of structure 308 may be able to communicate with aggregation server system 340. It may also be possible for a smart-home device to communicate directly with a wireless mobile device, such as a cellular phone or tablet computer, that can communicate directly with a cellular network. Since cellular phones and tablet computers use batteries for power, such a communication route may remain available during a power outage.

Aggregation server system 340 may serve to receive notifications of power outages from various structures, such as those that have one or more smart-home devices installed. While aggregation server system 340 may only be able to receive power outage information from smart-home devices, aggregation server system 340 may be able to make inferences on structures that do not have smart-home devices. For instance, if multiple structures connected with electrical grid 330 have indicated that power outage has occurred, aggregation server system 340 may determine that all structures connected with electrical grid 330 are suffering from a power outage. Therefore, aggregation server system 340 may notify utility provider 350 of the structures likely suffering from a power outage, including those with smart-home devices that report a power outage and structures that do not have smart-home devices. Further, it may be possible that, due to the power outage, one or more of the structures may have smart-home devices that are unable to connect with network 370 due to the power outage. Therefore, while the smart-home device may log the power outage and provide an indication of the power outage to aggregation server system 340 once power has been restored, the smart-home device may be unable to report the power outage while the power outage is ongoing. Eventual reporting of the power outage by the smart-home device, once power has been restored, may still be useful to aggregation server system 340 for future determination of which structures are likely affected in a power outage.

Utility provider 350 may represent an entity responsible for maintaining delivery of power via electrical grids 330, 335, and 333. Utility provider 350 may receive an indication of a cluster of power outages from aggregation server system 340 via network 370. The cluster may indicate one or more structures that have lost power, a time at which the power outage occurred, and/or a likely electrical grid that was affected by the power outage. Depending on the amount of power outage data collected by aggregation server system 340, it may be possible for aggregation server system 340 to estimate an area within electrical grid 330 that has failed. For instance, a downed power line may affect half of the structures on electrical grid 330 while leaving the other half of structures unaffected. In some embodiments, rather than network 370 being used for communication between aggregation server system 340 and utility provider 350, aggregation server system 340 may be operated by utility provider 350 or some other form of communication may be used between the operator of aggregation server system 340 and utility provider 350. For example, an operator of aggregation server system 340 may send an email or call utility provider 350. Aggregation server system 340 may select utility provider 350 from multiple utility providers based on the location of the detected power outage. For example, each electrical grid may be associated with particular utility provider. Once notified of the power outage, utility provider 350 may take steps to remedy the power outage, such as repairing power lines, replacing equipment, or rerouting power distribution.

Aggregation server system 340 may use network 370 to access social media 360. Social media 360 may represent a service typically used by various users who may occupy structures 301-326 to post questions, comments, pictures, and opinions, such as Facebook®, Twitter®, and Instagram®. Social media 360 may be monitored for various keywords or hashtags that are indicative of a power outage occurring. Since aggregation server system 340 may be associated with a service provider that manages functions of smart-home devices, aggregation server system 340 may have previously received information from users that links various social media user names, email addresses, or handles to various structures or smart-home devices within such structures. A user account maintained by a service provider that was established for a smart-home device may be linked with social media information for the user associated with the smart-home device. For instance, aggregation server system 340 may be aware that a Twitter® user by the name of "JohnDoe2727" lives in structure 315. If "JohnDoe2727" posted to Twitter® "Power out!", aggregation server system 340, such as based on a keyword search for "power" and "out," may determine that power has been lost at structure 315, even if no smart-home device located in structure 315 can connect with network 370. Such information from social media 360 may be used in place of or to augment information collected from smart-home devices by aggregation server system 340.

Electric grids 330 and 335 may be connected with a same electricity distribution network. If power is lost on electric grid 330 but not electric grid 335, smart home devices at one or more of structures 317-323 may be requested by aggregation server system 340 to use a back-up power generator. This may reduce stress on the electric distribution network when electric HVAC systems are being reinitiated on electric grid 330. Additionally, if any of structures 301-316 have backup power generators, these structures may be scheduled to have their electric HVAC systems reinitiated (using power from electric grid 330) after electric HVAC systems at structures on electric grid 330 that do not have backup generators have been restarted.

Figure 4:
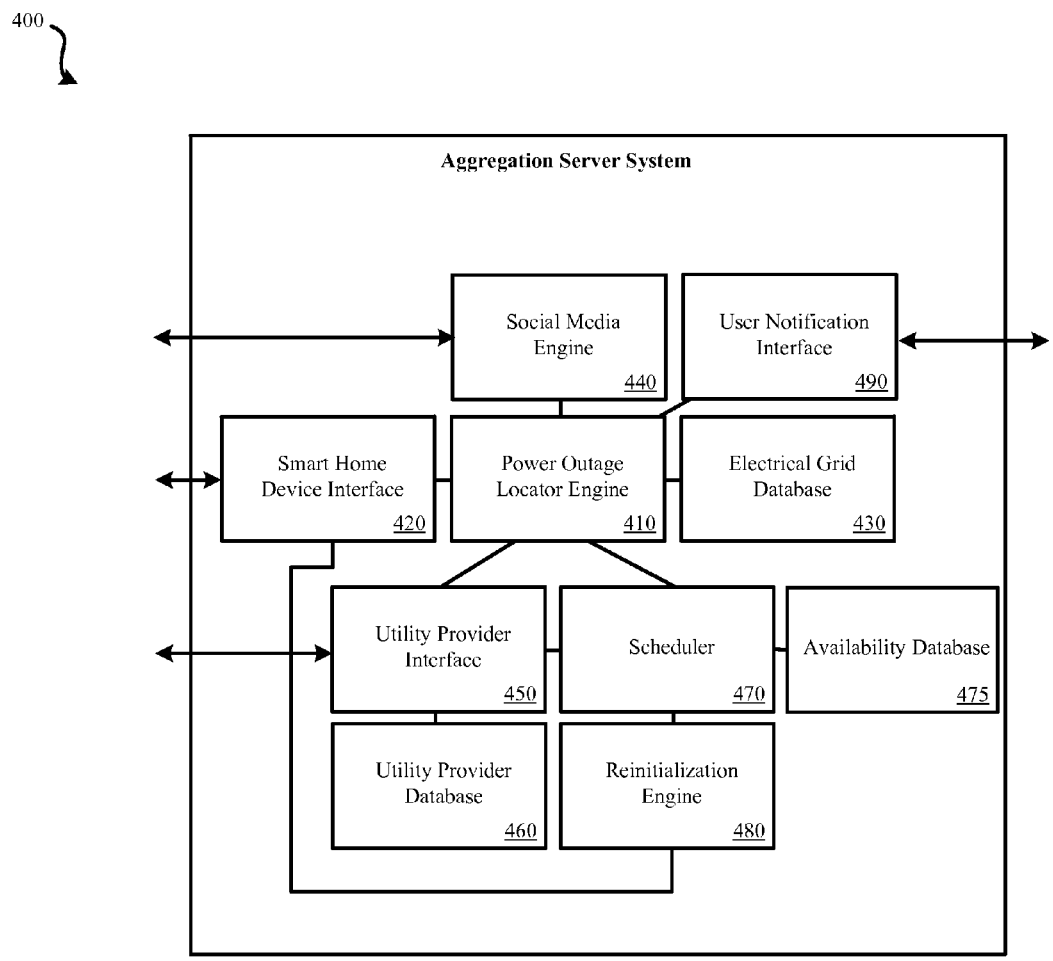
FIG. 4 illustrates an embodiment of an aggregation server system.

FIG. 4 illustrates an embodiment of an aggregation server system 400. Aggregation server system 400 may represent aggregation server system 340 of FIG. 3. Aggregation server system 400 may represent one or more computer systems that may be distributed and may be used for identifying power outages and scheduling reinitialization of electrical HVAC systems. Aggregation server system 400 is illustrated as having various components. Such components may be implemented using hardware, firmware, or software. In the case of software, the individual modules may be implemented using underlying hardware. For components, aggregation server system 400 may include: power outage locator engine 410, smart-home device interface 420, electrical grid database 430, social media engine 440, utility provider interface 450, utility provider database 460, scheduler 470, reinitialization engine 480, and user notification interface 490.

Smart-home device interface 420 may serve to handle communication to and from smart-home devices, such as those of FIGS. 1-3. As such, smart-home device interface 420 may receive indications of power outages from smart-home devices. Messages to be transmitted to smart-home devices may be routed through smart-home device interface 420.

Power outage locator engine 410 may serve to determine the location, electrical grid, and/or cause of power outages. Power outage locator engine 410 may receive power outage information from various smart-home devices via smart-home device interface 420. Based upon information present within the messages received from smart-home devices and/or by cross-referencing information received in such messages with a database of location information for the user accounts associated with the smart-home devices, power outage locator engine 410 may be able to determine when each smart-home device experiences the power outage and the location of each smart-home devices. The location and timing of the power outages experienced by smart-home devices may be used by power outage locator engine 410 in determining whether a power outage has occurred (rather than a problem at an individual structure) and whether such power outages are related (e.g., due to a common cause). For instance, each power outage indication received by smart-home device interface 420 may indicate a timestamp at which the power outage was first observed by the smart-home device. Timestamps may be required to occur within a threshold period of time of each other to be considered attributable to a common power outage event. In some embodiments, the geographic location of the structures in which the smart-home devices are located may be used in assessing whether a common power outage is responsible for the power loss at the structures. For instance, in some embodiments, power outage locator engine 410 may only have access to a ZIP Code in which the smart-home device is located rather than a specific address or coordinates. Therefore, for example, if several smart-home devices reported a power outage occurring (e.g., based on timestamp) within a threshold period of time at each other and are each located in the same ZIP Code, it may be assumed that a power outage did occur and a single event is attributed with causing the power outage at each structure associated with the smart-home devices.

In some embodiments, power outage locator engine 410 has access to electrical grid database 430. Electrical grid database 430 may associate ZIP Codes or specific addresses with electrical grids. For instance, electrical grid database 430 may indicate which structures are connected with the same electrical substation. Electrical grid database 430 may be stored by aggregation server system 400 or may be externally accessible. For instance, a utility provider may provide access to an electrical grid database maintained by the utility provider. Power outage locator engine 410 may be able to use electrical grid database 430 to determine an affected electrical grid and/or other structures, even those without smart-home devices, that are likely affected by a power outage. Further, when messaging a smart-home device, power outage locator engine 410 may be able to provide an indication indicative of how widespread a power outage appears to be. For instance, if the power outage appears to affect multiple electrical grids, power outage locator engine 410, via smart-home device interface 420, may be able to provide an indication for presentation to a user that indicates a large-scale power outage has occurred.

Power outage locator engine 410 may actively query smart-home devices from which no power outage notification was received. For instance, using information from electrical grid database 430, power outage locator engine 410 may be able to determine other smart-home devices, associated with other structures, which may have been affected by the power outage. If power outage locator engine 410 queries such a smart-home device via smart-home device interface 420 and no response is received, it may be assumed that the power outage did affect the smart-home device and has rendered communication with the smart-home device impossible. If a response is received, and the response is indicative of power at the smart-home device not being lost, the power outage locator engine 410 may use such information in assessing the scope and/or presence of the power outage.

Power outage locator engine 410 may be in communication with social media engine 440. Social media engine 440 may be configured to access one or more social media providers and use information provided by such social media providers in identifying power outages. When a user creates a user account associated with the smart-home device, the user may be prompted to provide social media information, such as a username, email address, or handle. Such information may be stored by aggregation server system 400 such that posts or other information made public on social media by the user may be associated with the structure and/or smart-home device that the user has associated with the user account. Social media engine 440 may apply various techniques to obtain information from one or more social media providers, such as, for example, a keyword and/or key phrase search for information relevant to a power loss (e.g., "power", "loss", "electricity", "lights out", the utility provider's name). If a user makes a post to social media indicative of a power loss, social media engine 440 may retrieve a username or other identifier associated with the post and determine if the user name is associated with a smart-home device for which aggregation server system 400 has access to a user account. Alternatively, social media engine 440 may monitor the specific social media feeds for users that are provided social media information and may determine if such posts relate to a power outage.

Once power outage locator engine 410 has identified a cluster of structures experiencing a power loss, power outage locator engine 410 may instruct utility provider interface 450 to notify the appropriate utility provider. Utility provider interface 450 may use location information for the power outage received from power outage locator engine 410 to access utility provider database 460 and determine the appropriate utility provider. Utility provider database 460 may include instructions on how utility provider interface 450 should notify the utility, such as via email, and automated recorded message, or through some form of application programming interface. Utility provider interface 450 may provide the appropriate utility provider with an indication of the power outage. This indication may indicate the structures from which information indicative of the power loss was received. The indication may also indicate structures at which the power outage locator engine 410 estimates power has also been lost but from which information was not received (e.g., either due to smart-home devices that cannot connect to the Internet being present in such structures or such structures not having any smart-home devices that communicate with aggregation server system 400).

Scheduler 470 may be used to coordinate the reinitialization of electrical HVAC systems that are controlled by the smart-home devices from which power outage information was received by smart-home device interface 420. Depending on the size of the power outage indicated by power outage locator engine 410, and information specific to the utility provider such as derived from utility provider database 460, scheduler 470 may determine if the reinitialization of electrical HVAC systems may be staggered and, if so, how such reinitialization should be staggered. For instance, scheduler 470 may create a schedule that causes the smart-home device that controls electrical HVAC systems to turn on (if necessary) after at least a threshold period of time following power being restored to the smart-home device. Therefore, for example, two smart-home devices that each experienced a same power outage may be scheduled to have their electrical HVAC systems restart at staggered times following a power outage; for example, the first smart-home device may initialize its electrical HVAC system 30 seconds after the power outage has ended while the second smart-home device may be scheduled to have its electrical HVAC system reinitialize 45 seconds after the power outage has ended. In some embodiments, scheduler 470 may take into account which smart-home devices have electrical HVAC systems and which do not. For instance, when heating is expected to be used, such as during the winter, a smart-home device that controls an oil or gas furnace may not be included in the schedule created by scheduler 470. For instance, a user account associated with each smart-home device may include information indicative of the type of HVAC systems controlled by that smart-home device. In other embodiments, the power outage notification received by smart-home device interface 420 may be indicative of the type of HVAC systems controlled by the smart-home device. In some embodiments, regardless of the type of HVAC systems controlled by the smart-home device, scheduler 470 may schedule a restart time for the HVAC systems of the smart-home device. In such embodiments, the smart-home device may be configured to ignore the schedule for non-electrical HVAC systems.

Scheduler 470 may access availability database 475 to determine whether smart home devices associated with a particular user account have opted in or opted out from being managed by scheduler 470. For instance, during an initial setup or configuration of a smart home device (or via settings accessible via the aggregation server system), a user may provide input indicating whether to opt-in to allowing scheduler 470 to schedule reinitialization of an electric HVAC system following a power outage or opt-out to prevent scheduler 470 from scheduling such reinitialization. Whether a user has opted-in or opted-out may also control whether the smart home device transmits a power loss notification to the aggregation server system. An indication of the opt in/out preference may be stored by the smart home device and/or may be stored by availability database 475 for use in determining which smart home devices are eligible to be scheduled.

Scheduler 470 may access utility provider database 460 for information provided by the utility provider indicative of how staggered the restart of electrical HVAC systems following resolution of the power outage should be. For instance, a utility provider that has old or heavily loaded substations may request the restart of electrical HVAC systems be more staggered then another utility that has more modern or less heavily loaded substations. Further, considering various electrical grids may be loaded differently, may use different equipment, and/or may be connected with varying numbers of structures, the staggering of the restart of electrical HVAC systems may be varied by electrical grid. The number of structures estimated to have lost power may also be factored in to how staggered the restart of electrical HVAC systems are. Scheduler 470 may use utility provider database 460 in determining how staggered the restart of electrical HVAC system should be and may also access electrical grid database 430 in assessing the staggering, such as for determining the size of electrical grid affected by the outage. When scheduler 470 is staggering the restart of electrical HVAC systems, scheduler 470 may schedule some number of smart-home devices to restart electrical HVAC systems at a certain time following the power outage being resolved. Following a longer time after the power outage being resolved, some other group of smart-home devices may be scheduled for their electrical HVAC systems to be restarted. In some embodiments, rather than scheduling the restarts in blocks, a continuous timeline of restarts may be scheduled. That is, each smart-home device involved in the power outage may be provided with a different time period to wait before reinitializing its electrical HVAC systems.

Based upon the schedule created by scheduler 470, reinitialization engine 480 may send the message to each smart-home device via smart-home device interface 420 indicative of when the smart-home device should reinitialize its electrical HVAC systems following restoration of power. The communication from reinitialization engine 480 to the smart devices may follow the same or similar communication paths as the power outage information was received. For instance, referring back to FIG. 3, since smart-home device 381 cannot connect directly to network 370 due to the power outage, aggregation server system 340 may pass the reinitialization message to smart-home device 381 via smart-home device 383. Aggregation server system 400 may be aware of the communication path to be used to communicate with smart-home device 381 due to information received with the power outage message received from smart-home device 381 indicative of the communication path used.

Even if a smart-home device was unable to initially report a power outage to aggregation server system 400 such as due to a loss of a network connection, it may be possible to use scheduler 470 to schedule the restart of that smart-home devices electrical HVAC systems. For instance, based on data from electrical grid database 430 and/or a query to the smart-home device that went unanswered, it may be determined that the uncommunicative smart-home device was likely affected by the power outage. Once power has been restored, that smart-home device may be configured to wait at least a defined period of time to allow its Internet connectively to restore and receive messages prior to starting its electrical HVAC system. Alternatively, the smart-home device may wait for its Internet connectivity to be restored and may actively query aggregation server system 400. Once power has come back online and Internet connectivity has been restored (e.g., a cable modem and wireless router has reinitialized), that smart-home device may be able to communicate with aggregation server system 400 via the Internet. The smart-home device may wait a period of time to see if a message is received from reinitialization engine 480 that specifies a time period to wait before turning on its electrical HVAC system or the smart-home device may query aggregation server system 400 to determine when it should restart its electrical HVAC system.

Figure 5:
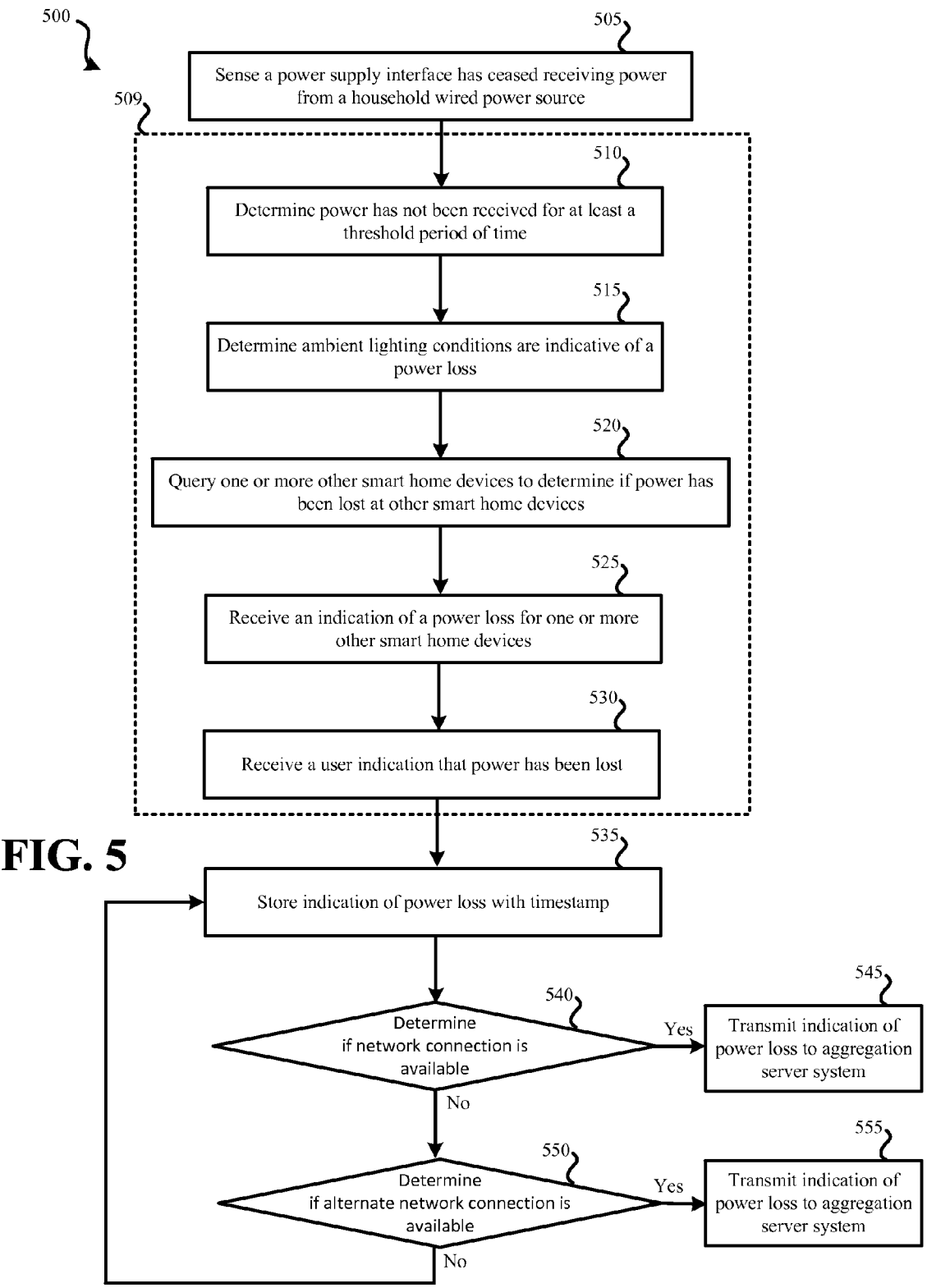
FIG. 5 illustrates an embodiment of a method for reporting a power outage by a smart-home device.

Various methods may be performed using the systems and devices detailed in relation to FIGS. 1-4. FIG. 5 illustrates an embodiment of a method 500 for reporting a power outage by a smart-home device. Method 500 may be performed using the smart-home device of FIG. 1, the thermostat of FIG. 2, or some other form of smart-home device. Each block of method 500 may be performed by a smart-home device, such as the smart thermostat of FIG. 2.

At block 505, a smart-home device may sense that its power supply interface has ceased receiving power from a structure's wired power supply. Household wiring may typically carry 120 V AC or 240 V AC. A smart-home device may be plugged into an electrical outlet to receive power or may be hardwired, either directly or indirectly, with a household's electrical wiring. Thermostats may typically be wired into a household's HVAC control wiring, which may be electrically connected with a household's electrical system via a transformer. For example, in North America, an HVAC transformer typically lowers the household voltage to 24 V AC for use in controlling one or more HVAC systems present within the household. Referring to FIG. 1, smart-home device 100 may monitor whether power has ceased to be received using power supply monitor 111 via structure power supply interface 120, which may be electrically connected with the household's HVAC transformer that derives power from the household's wired electrical system. When block 505 occurs, the smart-home device may immediately switch to using one or more batteries or capacitors for stored power.

Once the power supply interface has ceased receiving power at block 505, one or more confirmation blocks 509 may be performed to disambiguate a structure's power loss from power being lost to the smart-home device but not to the structure as a whole. For instance, it may be desirable for the smart-home device to be able to determine if it has been unplugged or is on a circuit that has been tripped at a breaker box (while other circuits in the structure remain untripped).

At block 510, the amount of time that power has been lost from the smart-home device may be monitored. In order for the smart-home device to confirm that power has been lost, the smart-home device may detect that a household's power has been present followed by the household's power becoming unavailable for at least a threshold period of time. For instance, a brief (e.g., several second) loss of power to the smart-home device may represent a brief hiccup in power deliver, to the structure. As such, a predefined stored threshold time, such as five seconds, may be required to elapse without power being received for the smart-home device to determine that a power loss has occurred.

At block 515, ambient lighting conditions in the vicinity of the smart-home device may be assessed to determine if such lighting conditions are indicative of a power outage. For example, a loss of artificial lighting may be indicative of a power loss. If, substantially contemporaneous with block 505 (e.g., within a threshold period of time, such as one second), a decrease in artificial lighting in the ambient environment of the smart-home device may be indicative of one or more lights within the structure also losing power. Referring to thermostat 200, light sensor 255, in combination with ambient light engine 113, may be used to determine that one or more lights within the structure have also lost power. If artificial lighting is still detected in the environment of the smart-home device following block 505, it may be determined by the smart-home device that the structure has not lost power.

At block 520, one or more other smart-home devices may be queried. Such other smart-home devices may be queried to determine if such other smart-home devices have also lost power. It may be possible that one or more of such other smart-home devices located in the structure will respond indicating whether or not power from the structure's wired power source is being received. If any of such other smart-home devices do not have a battery backup, a failure to respond may be interpreted as a power loss having occurred. In some embodiments, rather than querying such one or more other smart-home devices, such other smart-home devices may be configured to transmit an indication of power loss if such power loss has occurred (without being triggered by a query). At block 525, one or more indications may be received that are indicative of whether or not a power loss is present at the one or more other smart-home devices. In one possible embodiment, the smart-home device performing method 500 may be a smart thermostat. A smart hazard detector located within the same structure may also be connected with a structure's wired electrical system, possibly via a different circuit of a breaker box. Such a smart hazard detector may respond to the query at block 525 or may be configured to transmit a power outage notification if a power loss is detected regardless of a query being received.

At block 530, a user indication may be received that is indicative of power being lost. This indication may be provided by the user in response to the smart-home device displaying a message requesting confirmation of whether power has been lost to the structure. Alternatively, in some embodiments, a request may be transmitted to a remote server and sent to a wireless device of the user. The request may prompt the user at a wireless device to confirm that power has been lost at the structure. In some embodiments, the smart-home device may output an auditory message, such as a recorded or synthesized spoken message, that indicates the power outage. The user may be prompted to provide a focal response indicating whether or not the power outage is occurring at the structure.

One or more of confirmation blocks 509 may be performed as part of method 500. If multiple confirmation steps are performed, for a power outage to be considered present, it may be required for each of the confirmation steps to agree that a power outage has occurred. In other embodiments, a voting scheme may be used in that more confirmation steps must indicate a power outage as compared to steps indicating power is present for a power outage to be determined to be present by the smart-home device. If, following one or more of confirmation blocks 509 being performed, it is determined that a power outage has occurred, method 500 may proceed to block 535. At block 535, the smart-home device may store an indication of the power loss. The indication of the power loss may include a timestamp to indicate the date and time at which the power outage was determined to have occurred. In some embodiments, one or more characteristics of the power outage may also be stored such as whether a power surge was detected just prior to the power outage.

At block 540, it may be determined if the network connection usually used by the smart-home device is available. In some situations, the structure's network connection and wireless network, which may typically be used by the smart-home device for communication with the Internet, may be protected by a UPS. Such a UPS may protect the Internet connection and, possibly, a wireless router from being disrupted due to a power outage. If the network connection is available, at block 545 the indication of the power loss may be transmitted to a remote aggregation server system. The remote aggregation server system, such as detailed in relation to FIG. 4, may be part of a cloud-computing system operated by a provider of the smart-home device. As such, a user account associated with the smart-home device may be established with the cloud-computing system. The indication of the power outage may include an identifier of the user account and/or the smart-home device. Location information, such as an address or ZIP Code, may also be included. The timestamp and/or characteristics of the power outage may also be included in the indication the power outage transmitted to the aggregation server system.

At block 550, if the network connection usually used by the smart-home device is determined not to be available at block 540, the smart-home device may determine if an alternate network connection is available. For example, the smart-home device may attempt to communicate with a smart-home device located in another structure, which may be able to forward the smart-home devices message either via the Internet to the aggregation server system or to another smart-home device which may then be able to forward the message via the Internet to the aggregation server system. The smart-home device may also be able to establish a direct communication link, such as using Bluetooth®, Wi-Fi Direct®, or some other form of local wireless direct communication protocol, with a mobile device, such as a cellular phone or tablet computer, of a user located in the structure. The mobile device may be able to then forward the message from the smart-home device to the aggregation server system via an alternate network connection, such as via a cellular network. Other forms of network connections may also be checked for availability at block 550. Block 555 occurs if an alternate network connection is determined to be available that can be used to contact the aggregation server system. If at block 550 no alternate network connection that can communicate with the aggregation server system is identified, the indication of the power loss may remain stored at block 535 and the smart-home device may periodically repeat blocks 540 and 550 in an attempt to communicate with the aggregation server system. While method 500 is being performed, the smart-home device may continue to monitor for the power being restored. Other functions of the smart-home device may also continue to be performed during method 500; for example, if the smart-home devices is a hazard detector, the smart-home device may continue to monitor for the presence of smoke and/or carbon monoxide.

Figure 6:
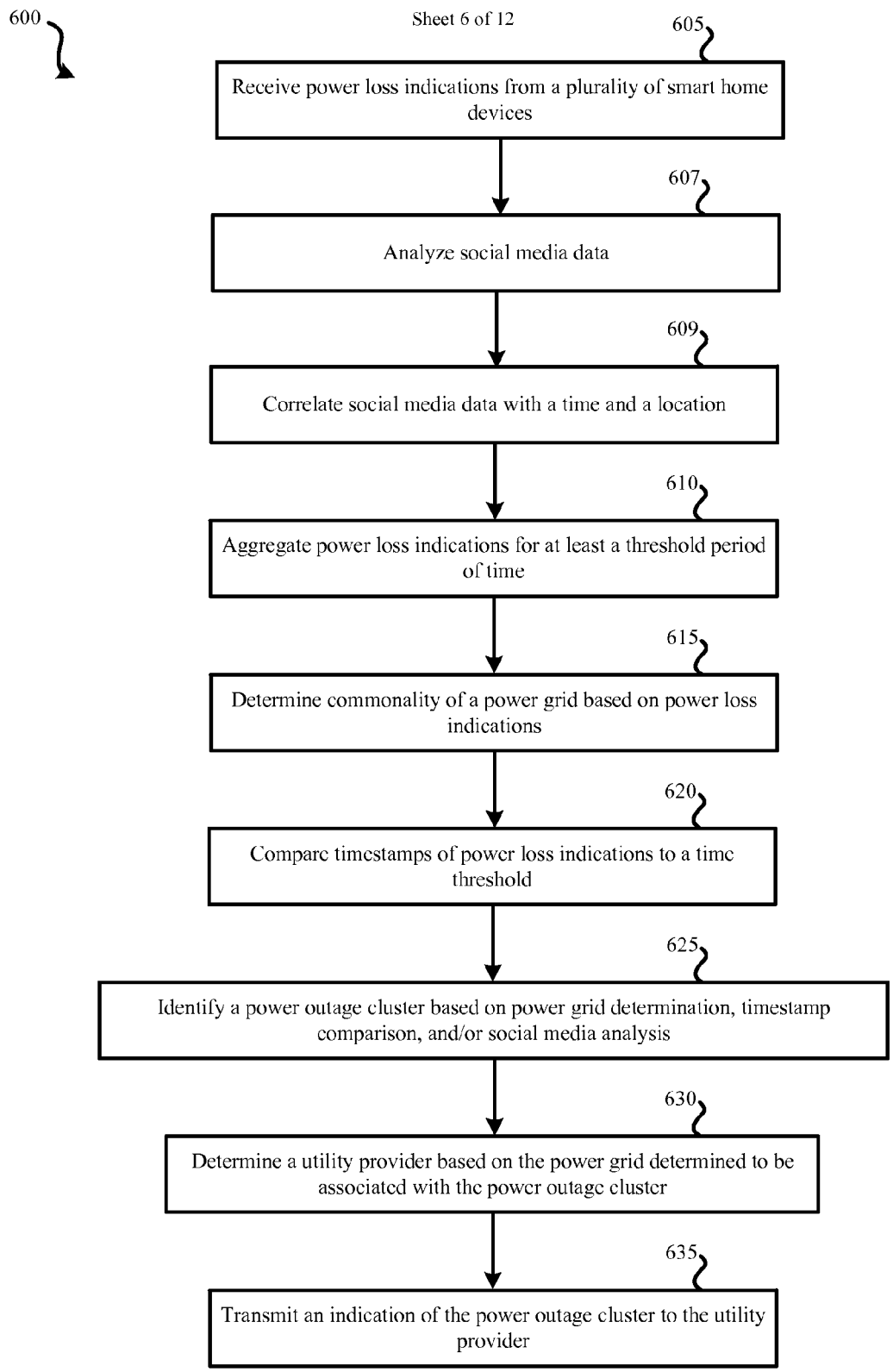
FIG. 6 illustrates an embodiment of a method for aggregating power outage information.

FIG. 6 illustrates an embodiment of a method for aggregating power outage information. Method 600 may be performed using the aggregation server system of FIG. 4 or some other form of computer system that can receive information from multiple smart-home devices. Each block of method 600 may be performed by an aggregation server system, which may include one or more centrally-located or distributed computer servers. An exemplary computer system which may serve as one of the computer servers is detailed in relation to FIG. 12.

At block 605, following a power loss, power loss indications may be received from a plurality of smart-home devices. Each of these indications may include an indication of a smart-home device (which sent the indication), a location, user account, and/or timestamp. If an indication of a user account is included, the aggregation server system may have access to data indicative of a location (e.g., address, coordinates, or ZIP code associated with the user account). The power loss indications of block 605 may be received over a period of time, such as several seconds, minutes, or even hours. The received indications may include routing information that can be used by the aggregation server system to send a message back to the smart-home device, such as an acknowledgment.

At block 607, social media, from one or more social media providers, may be analyzed. An aggregation server system may monitor social media accounts associated with smart-home device accounts. For instance, if a user installed a smart-home device and created an account with the aggregation server system for the smart-home device (which is linked with the structure in which the smart-home device is installed), the user may provide social media account information that is used to link the structure of the smart-home device with the social media account. Therefore, posts made by the user to social media can be parsed by the aggregation server system to determine if the posts are relevant to power delivery to the structure of the user. For instance, the aggregation server system may monitor for various keywords, emojis, emoticons, timestamps, and locations. As an example, if a smart-home device sends a message at block 605 indicative of a power loss to the aggregation server and a user posts to social media from his home a message such as "Looks like I'm not watching football tonight! ☹ ", the social media post can serve as a confirmation that power has been lost at the structure in which the smart-home device is installed. At block 609, a message posted by a user to social media may be correlated with a time and/or location. For instance, a social media post made by the user within several minutes after a timestamp indicated in the power loss indication from the smart-home device while the user is at the structure may be especially useful in ascertaining if a power loss has occurred. For instance, the above message posted to social media may be interpreted as related to a power loss at the user's home based on a word search and/or a negative emoticon/emoji being present (e.g., a frowning face) in a message posted within a threshold period of time of the power outage being reported as occurring by a smart-home device and/or the social media post being posted from a location consistent with the user's home.

At block 610, power loss indications may be aggregated for at least a threshold period of time or at least until a threshold number of power loss indications are received. For instance, an aggregation server system may not notify a utility provider of a power outage unless it receives an indication of a power outage from at least a threshold number (e.g., three) smart-home devices in geographic proximity to each other or are on the same electrical grid. Therefore, at block 610, the aggregation server system may wait for additional power loss notifications to be received from smart-home devices and/or may continue to analyze social media data until a certainty level of a power outage is reached by the aggregation server.

At block 615, a commonality of a power (electrical) grid may be determined based on the geographic proximity of power loss indications and/or by comparing the locations of the power loss indications with a mapping of electrical grids. As detailed in relation to electrical grid database 430 of FIG. 4, an aggregation server system may either store or have access to a mapping of electrical grids. Such a mapping may be used for determining a relationship of power outage indications on an electrical grid. For instance, if multiple power outage indications are received, it may be possible to determine a common component or location of the electrical grid that may have failed that could cause each smart-home device to lose power. It may be possible for the aggregation server system to query other smart-home devices at other structures to request information on whether such smart-home devices have power. If a response is received that is indicative of power being present, the analysis of the electrical grid may be updated in response to that smart-home device being known to have power. If no response is received, it may be assumed that the smart-home device does not have power. Rather than sending a query, the aggregation server system may wait for a period of time to determine if the smart-home device performs a periodic "check-in" with the aggregation server system. For instance, a smart-home device may be configured to query the aggregation server system once every thirty minutes (or some other period of time) when it is powered and has a network connection. If this periodic query is not received, the aggregation server system may assume the smart-home device has gone offline (e.g., due to a power failure).

At block 620, timestamps indicated in received power loss indications may be compared. Block 620 may also analyze the timestamps of social media posts and/or times when smart-home devices were expected to query the aggregation server and either successfully or unsuccessfully made contact. Timestamps of power loss indications that occur within a threshold time period of each other (and are located on the same electrical grid and/or within a threshold geographic distance) may be determined to be related. For instance, if two power loss indications have timestamps within five seconds of each other, it may be assumed that a common power loss event affected both smart-home devices.

At block 625, a power outage cluster that is determined to be caused by a common power outage event may be determined. The power outage cluster may be determined based on the factors analyzed at preceding blocks. For instance, a timestamp comparison of power loss indications, social media posts, and failed queries may be used; a comparison between geographic locations may be used and an analysis to an electrical grid mapping may be used in determining a power outage cluster attributable to a common power outage event. Each factor may be weighted. For instance, timestamps of power outage indications received from smart-home devices that are close in time may likely indicate a common event. But, if a large geographic distance exists between two power outage indications of smart-home devices, this distance may be heavily weighted to the power outages being due to unrelated events. Various algorithms may be implemented to weight such analyzed data and determine which data is indicative of a common power outage event.

At block 630, for the cluster identified at block 625, a utility provider may be determined. The location of the cluster may be analyzed against an electrical grid mapping to determine which utility service provider is responsible for the location of the cluster. The identification of block 625 may not require a detailed electrical grid mapping. For instance, if a cluster falls within a particular city or ZIP Code, it may be possible to look up the utility service provider responsible for that city or ZIP code. At block 635, an indication of the power outage cluster may be transmitted to the responsible utility provider. The indication of the power outage may include: indications of the structures that are known to have lost power, indications of structures suspected of losing power (which may include structures that do not have a smart-home device, but are on the same electrical grid as structures that do), a determined time of the power outage, and/or a suspected location on the electrical grid responsible for the power outage (e.g., a particular transformer, power substation, or power line). The type of transmitted indication may be based on the utility provider identified at block 630. For instance, a particular utility company may provide an email address to which such a notification may be sent. Another utility provider may provide an application programming interface that allows the indication transmitted at block 635 to directly interface with the utility provider's electrical grid management systems. Another utility may request that such indications come in the form of a telephone call. If necessary, at block 635, a person serving as an agent on behalf of the entity operating the aggregation server system may call or otherwise contact the appropriate utility provider at block 635.

Figure 7:
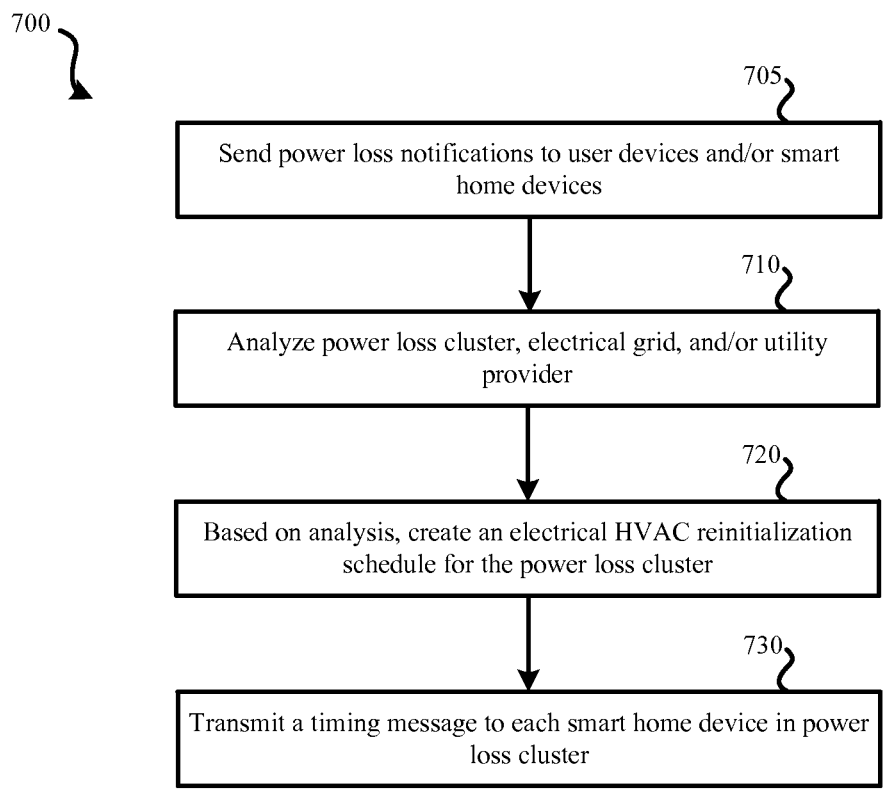
FIG. 7 illustrates an embodiment of a method for scheduling reinitialization of electrical HVAC systems by smart-home devices.

FIG. 7 illustrates an embodiment of a method 700 for scheduling reinitialization of electrical HVAC systems by smart-home devices. Method 700 may be performed using the aggregation server system of FIG. 4 or some other form of computer system that can receive information from and transmit information to multiple smart-home devices, such as smart thermostats. Each block of method 700 may be performed by an aggregation server system, which may include one or more centrally-located or distributed computer servers. An exemplary computer system which may serve as one of the servers is detailed in relation to FIG. 12. Method 700 may be performed for the smart-home devices from which power loss notifications were received as part of method 600. In some embodiments, if a smart-home device has lost power and cannot communicate with the aggregation server system during the power outage, the smart-home device may communicate with the aggregation server system once power has been restored before restarting an electrical HVAC system.

At block 705, power loss notifications may be transmitted to user devices and/or smart-home devices. The power loss notifications may indicate information that is known about the power outage. For instance, a time at which the power outage began, a location affected by the power outage, an approximate number of structures affected by the power outage, a cause of the power outage, an indication that the utility company has been notified, and an approximate time of power being scheduled to be restored may be indicated in the message. Such information may be determined as part of method 600. The power loss notifications may be sent to user devices via push notifications or by the user devices logging into the aggregation server system (e.g., by executing an application associated with the provider maintaining the aggregation server system). Such notifications may also be sent to the smart-home devices, thus allowing such information to be provided, such as via a display or a spoken message, at the structure suffering from the power loss.

At block 710, characteristics of the power loss cluster, characteristics of the electrical grid, and/or characteristics of the utility provider may be analyzed to determine how the reinitialization of electrical HVAC systems should be staggered. Regarding the characteristics of the power loss cluster, it may be determined how many electrical HVAC systems are present in the power loss cluster, how many electrical HVAC systems are likely to be turned on immediately following power being restored (e.g., based on an external temperature and a smart thermostat's set point temperature or an indication received from individual smart-home devices indicating the need to turn on the electrical HVAC system). The characteristics of the electrical grid (e.g., types of electrical equipment used on the grid, the specifications of the electrical grid) may be analyzed to determine a rate at which electrical HVAC systems can be reinitialized. The characteristics of the utility provider may be analyzed to determine if the utility provider has provided specifications for whether electrical HVAC system reinitializations should be staggered and, if so, at what rate.

Further, at block 710, based on information received from particular smart-home devices, the restart of particular electrical HVAC systems may be prioritized. For instance, if a cold exterior temperature is present, if the internal temperature at a first structure has decreased more than at a second structure, the smart-home device at the first structure may be scheduled to turn on sooner, thus prioritizing its electrical HVAC system over the electrical HVAC system in the second structure. If a temperature is below a low threshold (or above a high threshold), any scheduled time may be ignored by the smart-home device and an electrical HVAC system may be restarted as soon as power is available.

At block 720, based on the analysis of block 710, an electrical HVAC reinitialization schedule may be created by the aggregation server system. Each smart-home device may be assigned a time at which the smart-home device is permitted to reinitialize electrical HVAC systems. The time may be relative to when the power is restored. For instance, the time may indicate +2 minutes, thus causing the smart-home device to initialize the electrical HVAC system at least two minutes after power has been restored to the structure of the smart-home device. If power has already been restored, such as in the situation of a smart-home device contacting the aggregation server system after power has been restored, the time may be an absolute time at which the smart-home device becomes eligible to restart the electrical HVAC systems.

By accessing a user account associated with each smart-home device, it may be possible to determine which smart-home devices control electrical HVAC systems. Further, it may be possible to determine which electrical HVAC systems are likely to be activated based on current weather (e.g., the outside temperature near the structures housing the smart-home devices). For instance, if the external temperature is thirty degrees Fahrenheit, it may be unlikely that an electrical air conditioner would be turned on when the power is restored. The aggregation server system may exclude consideration of electrical HVAC systems from the schedule created at block 720 if, based on an external temperature at the structure, the electrical HVAC system is unlikely to be turned on following power being restored (e.g., based on a threshold temperature analysis). For instance, in winter, a structure having an oil-based HVAC heating system and an electric air conditioner may not be treated as having an electrical HVAC system because the air conditioner is unlikely to be used. The schedule created at block 720 may assign a slightly different time to each smart thermostat or to only smart thermostats known to control electrical HVAC systems. In some embodiments, the reinitialization is staggered in blocks. For instance, at a first time a first group of smart-home devices are scheduled to restart their electrical HVAC systems and at a second time a second group of smart-home devices are scheduled to restart their electrical HVAC systems.

At block 730, a timing message may be transmitted to each smart-home device in the power loss cluster with which communication is available. Such timing messages may only be sent to smart-home devices that control electrical HVAC systems. The timing message may indicate a time for the smart-home device from the schedule created at block 720. This time may be overridden by a user at the smart-home device. If a smart-home device does not receive a timing message (e.g., within a threshold time of the power being reinstated), the smart-home device may be free to restart any electrical HVAC system as needed. In other embodiments, the smart-home device may contact the aggregation server system to query for a timing message. If none is available, the smart-home device may be free to restart any electrical HVAC system as needed.

Figure 8:
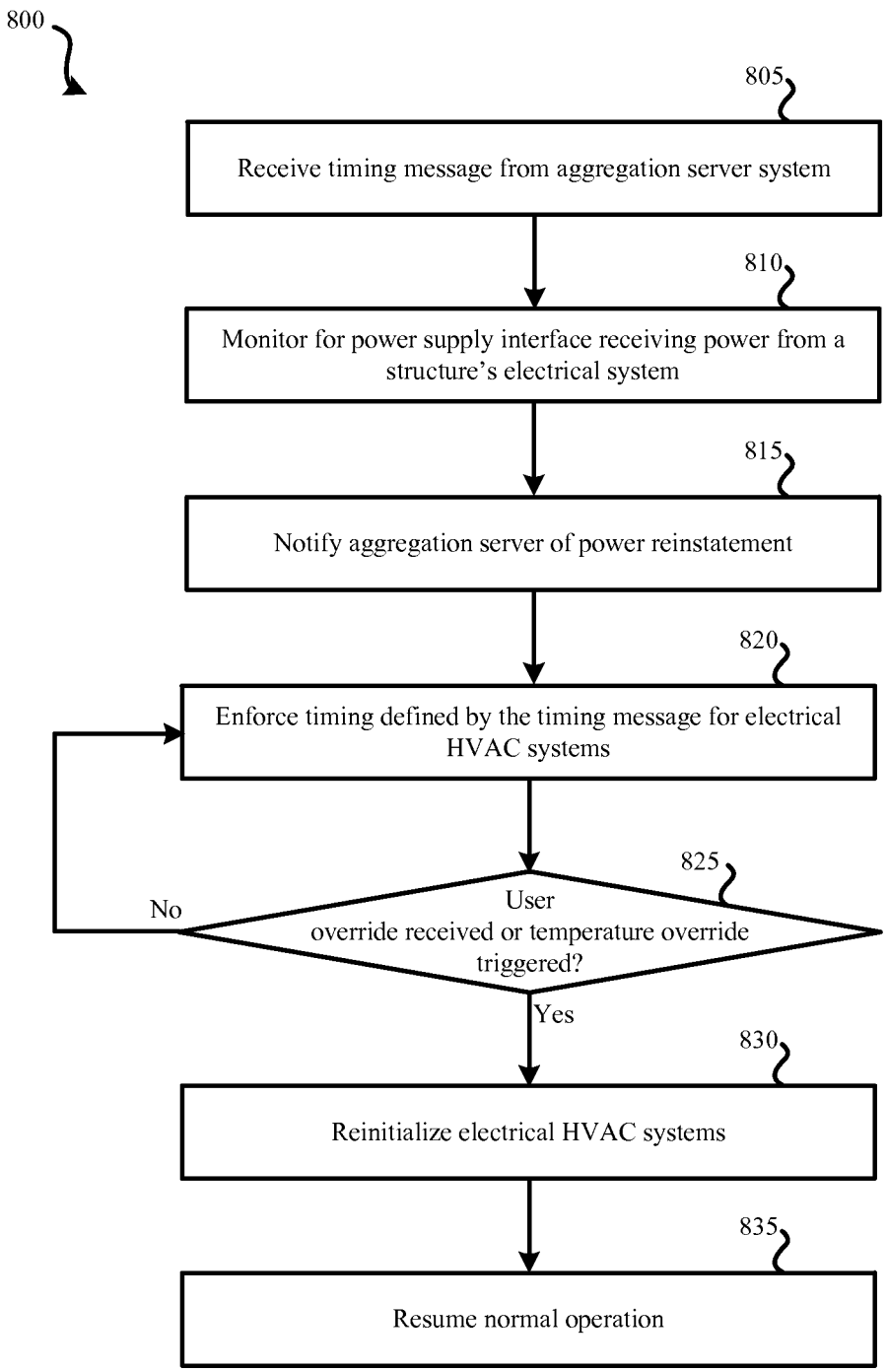
FIG. 8 illustrates an embodiment of a method for reinitializing electrical HVAC systems by a smart thermostat.

FIG. 8 illustrates an embodiment of a method 800 for reinitializing electrical HVAC systems by a smart thermostat. Method 800 may be performed using the smart-home device of FIG. 1, the thermostat of FIG. 2, or some other form of smart-home device. Each block of method 800 may be performed by a smart-home device, such as the smart thermostat of FIG. 2. Method 800 may be performed following an aggregation server system transmitting a timing message to a smart-home device that controls an electrical HVAC system.

At block 805, a timing message may be received from an aggregation server system. This timing message may indicate a time at which the smart-home device is eligible to reactivate one or more electrical HVAC systems. The timing may indicate an offset time from when power is determined by the smart-home device to be restored. Alternatively, an absolute time may be provided in the timing message if the aggregation server has information indicative of when power has been or will be restored. The timing message received by the smart-home device may only include timing information for the smart-home device or smart-home devices within the structure in which the smart-home device is installed. The timing message received at block 805 may be received via the same communication route as which the smart-home device initially used to transmit a power loss notification to the aggregation server system. The power loss notification may have been modified to include an indication of this communication route such that it could be reused in reverse for responding with the timing message. The timing message may also include other information, such as an indication of when power is expected to be restored, information on the cause of the power outage, and/or information about how widespread the power outage is.

At block 810, the smart-home device may monitor for restoration of power on the structure's electrical system if power has not yet been restored. Referring to smart thermostat 202, power supply monitor 111 may detect when power is available via structure power supply interface 120. Depending on the duration of the power outage, block 810 may take less than a second to many days.

At block 815, when power is restored, a notification of the power restoration being detected by the smart-home device may be transmitted to the aggregation server system. Once power is restored, the power restoration notification may not be sent for at least several seconds to allow the structure's network connection, including a local wireless network, to initialize and begin to communicate. The notification may include a timestamp that indicates when power was restored. In some embodiments, rather than the timing message being received ahead of the notification being transmitted at block 815, the notification may be transmitted first. In response to the notification being received by the aggregation server system, the aggregation server system may transmit the timing message. In such embodiments, the smart-home device may not reinitiate an electrical HVAC system until the timing message is received from the aggregation server system despite power having been restored. Alternatively, the smart-home device may wait at least a threshold period of time for the timing message before reinitializing an electric HVAC system.

After power has been restored, the smart-home device may be waiting an amount of time indicated in the timing message before restarting one or more electrical HVAC systems at block 820. During this time, it may be possible for a user to override the timing period specified by the timing message at block 825. For instance, a user could provide direct input to the smart-home device indicating that the electrical HVAC system should reinitiate immediately or the user could, via a wireless device, transmit a message to the smart-home device indicating that the electrical HVAC system should reinitiate immediately. If no user input is received, the timing defined by the timing message may be enforced until the time period elapses, at which time method 800 may proceed to block 830.

In some embodiments, at block 825, an override other than one provided by a user may be possible. A temperature-based override enforced by the smart-home device may ignore the timing indicated in the timing message if a low (or high) threshold temperature is measured by the smart-home device. For instance, such a threshold may be used to help prevent pipes from freezing within the structure. If the internal temperature of the structure reaches such a low or high threshold, and the electrical HVAC system is a proper type to correct the structure's internal temperature (that is, if a low threshold temperature is reached, the structure's heating system is electric, or if a high temperature threshold is reached, the structure's cooling system is electric), the timing indicated by the timing message may be overridden and method 800 may proceed to block 830.

At block 830, one or more electrical HVAC systems controlled by the smart-home device may be reinitiated. Such one or more electrical HVAC systems may only be reinitiated if the smart-home device determines that activation of the electrical HVAC system is necessary to adjust the internal temperature of the structure to a set point temperature. For instance, if the electrical HVAC system is a baseboard heater, the set point temperature is 68 degrees, and the measured internal temperature of the structure is at or above 68 degrees; while the smart-home device may now be eligible to restart the electrical HVAC system with the time indicated in the timing message elapsing, there may be no need to immediately reinitiate the electrical HVAC system based on the temperature within the structure. At block 835, following power being restored and the electrical HVAC system being reinitiated, normal operation of the electrical HVAC system and the smart-home device may resume.

Figure 9:
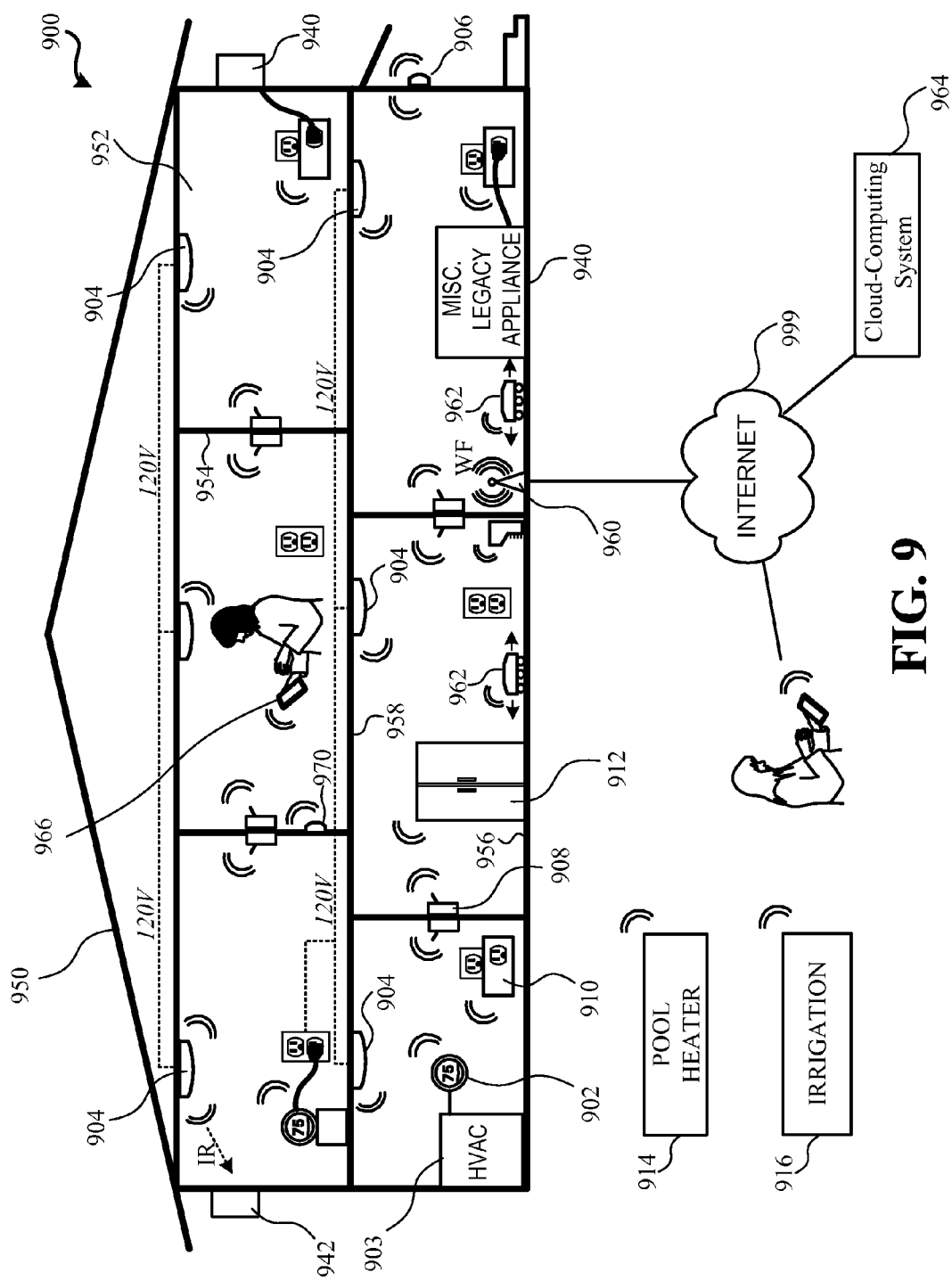
FIG. 9 illustrates an embodiment of a smart-home environment within which one or more of the devices, methods, systems, services, and/or computer program products described herein may be applicable.

Hazard detectors, as detailed herein, may be installed in a smart-home environment. FIG. 9 illustrates an example of a smart-home environment 900 within which one or more of the devices, methods, systems, services, and/or computer program products described further herein can be applicable. The depicted smart-home environment 900 includes a structure 950, which can include, e.g., a house, office building, garage, or mobile home. It will be appreciated that devices can also be integrated into a smart-home environment 900 that does not include an entire structure 950, such as an apartment, condominium, or office space. Further, the smart home environment can control and/or be coupled to devices outside of the actual structure 950. Indeed, several devices in the smart home environment need not physically be within the structure 950 at all. For example, a device controlling a pool heater or irrigation system can be located outside of the structure 950.

The depicted structure 950 includes a plurality of rooms 952, separated at least partly from each other via walls 954. The walls 954 can include interior walls or exterior walls. Each room can further include a floor 956 and a ceiling 958. Devices can be mounted on, integrated with and/or supported by a wall 954, floor 956 or ceiling 958.

In some embodiments, the smart-home environment 900 of FIG. 9 includes a plurality of devices, including intelligent, multi-sensing, network-connected devices, that can integrate seamlessly with each other and/or with a central server or a cloud-computing system to provide any of a variety of useful smart-home objectives. The smart-home environment 900 may include one or more intelligent, multi-sensing, network-connected thermostats 902 (hereinafter referred to as smart thermostats 902), one or more intelligent, network-connected, hazard detectors 904, and one or more intelligent, multi-sensing, network-connected entryway interface devices 906 (hereinafter referred to as "smart doorbells 906"). According to embodiments, the smart thermostat 902 detects ambient climate characteristics (e.g., temperature and/or humidity) and controls a HVAC system 903 accordingly. The hazard detector 904 may detect the presence of a hazardous substance or a substance indicative of a hazardous substance (e.g., smoke, fire, or carbon monoxide). The smart doorbell 906 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 900 of FIG. 9 further includes one or more intelligent, multi-sensing, network-connected wall switches 908 (hereinafter referred to as "smart wall switches 908"), along with one or more intelligent, multi-sensing, network-connected wall plug interfaces 910 (hereinafter referred to as "smart wall plugs 910"). The smart wall switches 908 may detect ambient lighting conditions, detect room-occupancy states, and control a power and/or dim state of one or more lights. In some instances, smart wall switches 908 may also control a power state or speed of a fan, such as a ceiling fan. The smart wall plugs 910 may detect occupancy of a room or enclosure and control supply of power to one or more wall plugs (e.g., such that power is not supplied to the plug if nobody is at home).

Still further, in some embodiments, the smart-home environment 900 of FIG. 9 includes a plurality of intelligent, multi-sensing, network-connected appliances 912 (hereinafter referred to as "smart appliances 912"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 912 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 940, such as old conventional washer/dryers, refrigerators, and the like which can be controlled, albeit coarsely (ON/OFF), by virtue of the smart wall plugs 910. The smart-home environment 900 can further include a variety of partially communicating legacy appliances 942, such as infrared ("IR") controlled wall air conditioners or other IR-controlled devices, which can be controlled by IR signals provided by the hazard detectors 904 or the smart wall switches 908.

According to embodiments, the smart thermostats 902, the hazard detectors 904, the smart doorbells 906, the smart wall switches 908, the smart wall plugs 910, and other devices of the smart-home environment 900 are modular and can be incorporated into older and new houses. For example, the devices are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

The smart-home environment 900 may also include communication with devices outside of the physical home, but within a proximate geographical range of the home. For example, the smart-home environment 900 may include a pool heater monitor 914 that communicates a current pool temperature to other devices within the smart-home environment 900 or receives commands for controlling the pool temperature. Similarly, the smart-home environment 900 may include an irrigation monitor 916 that communicates information regarding irrigation systems within the smart-home environment 900 and/or receives control information for controlling such irrigation systems. According to embodiments, an algorithm is provided for considering the geographic location of the smart-home environment 900, such as based on the zip code or geographic coordinates of the home. The geographic information is then used to obtain data helpful for determining optimal times for watering; such data may include sun location information, temperature, due point, soil type of the land on which the home is located, etc.

By virtue of network connectivity, one or more of the smart-home devices of FIG. 9 can further allow a user to interact with the device even if the user is not proximate to the device. For example, a user can communicate with a device using a computer (e.g., a desktop computer, laptop computer, or tablet) or other portable electronic device (e.g., a smartphone) 966. A webpage or app can be configured to receive communications from the user and control the device based on the communications and/or to present information about the device's operation to the user. For example, the user can view a current setpoint temperature for a device and adjust it, using a computer. The user can be in the structure during this remote communication or outside the structure.

As discussed, users can control and interact with the smart thermostat, hazard detectors 904, and other smart devices in the smart-home environment 900 using a network-connected computer or portable electronic device 966. In some examples, some or all of the occupants (e.g., individuals who live in the home) can register their device 966 with the smart-home environment 900. Such registration can be made at a central server to authenticate the occupant and/or the device as being associated with the home and to give permission to the occupant to use the device to control the smart devices in the home. An occupant can use his registered device 966 to remotely control the smart devices of the home, such as when the occupant is at work or on vacation. The occupant may also use his registered device to control the smart devices when the occupant is actually located inside the home, such as when the occupant is sitting on a couch inside the home. It should be appreciated that, instead of or in addition to registering devices 966, the smart-home environment 900 makes inferences about which individuals live in the home and are therefore occupants and which devices 966 are associated with those individuals. As such, the smart-home environment "learns" who is an occupant and permits the devices 966 associated with those individuals to control the smart devices of the home.

In some embodiments, in addition to containing processing and sensing capabilities, each of the devices 902, 904, 906, 908, 910, 912, 914, and 916 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart devices via a wireless router 960. The smart devices can further communicate with each other via a connection to a network, such as the Internet 999. Through the Internet 999, the smart devices can communicate with a cloud-computing system 964, which can include one or more centralized or distributed server systems. The cloud-computing system 964 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from cloud-computing system 964 to devices (e.g., when available, when purchased, or at routine intervals).

According to embodiments, the smart devices combine to create a mesh network of spokesman and low-power nodes in the smart-home environment 900, where some of the smart devices are "spokesman" nodes and others are "low-powered" nodes. Some of the smart devices in the smart-home environment 900 are battery powered, while others have a regular and reliable power source, such as by connecting to wiring (e.g., to 120V line voltage wires) behind the walls 954 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 900 as well as with the cloud-computing system 964. On the other hand, the devices that are battery powered are referred to as "low-power" nodes. These nodes tend to be smaller than spokesman nodes and can only communicate using wireless protocols that require very little power, such as Zigbee, 6LoWPAN, etc. Further, some, but not all, low-power nodes are incapable of bidirectional communication. These low-power nodes send messages, but they are unable to "listen". Thus, other devices in the smart-home environment 900, such as the spokesman nodes, cannot send information to these low-power nodes.

As described, the smart devices serve as low-power and spokesman nodes to create a mesh network in the smart-home environment 900. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 900. The spokesman nodes in the smart-home environment 900 are able to "drop down" to low-powered communication protocols to receive these messages, translate the messages to other communication protocols, and send the translated messages to other spokesman nodes and/or cloud-computing system 964. Thus, the low-powered nodes using low-power communication protocols are able to send messages across the entire smart-home environment 900 as well as over the Internet 999 to cloud-computing system 964. According to embodiments, the mesh network enables cloud-computing system 964 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening." Accordingly, users, other devices, and cloud-computing system 964 can communicate controls to the low-powered nodes. For example, a user can use the portable electronic device (e.g., a smartphone) 966 to send commands over the Internet 999 to cloud-computing system 964, which then relays the commands to the spokesman nodes in the smart-home environment 900. The spokesman nodes drop down to a low-power protocol to communicate the commands to the low-power nodes throughout the smart-home environment, as well as to other spokesman nodes that did not receive the commands directly from the cloud-computing system 964.

An example of a low-power node is a smart nightlight 970. In addition to housing a light source, the smart nightlight 970 houses an occupancy sensor, such as an ultrasonic or passive IR sensor, and an ambient light sensor, such as a photoresistor or a single-pixel sensor that measures light in the room. In some embodiments, the smart nightlight 970 is configured to activate the light source when its ambient light sensor detects that the room is dark and when its occupancy sensor detects that someone is in the room. In other embodiments, the smart nightlight 970 is simply configured to activate the light source when its ambient light sensor detects that the room is dark. Further, according to embodiments, the smart nightlight 970 includes a low-power wireless communication chip (e.g., ZigBee chip or Thread chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 900 as well as over the Internet 999 to cloud-computing system 964.

Other examples of low-powered nodes include battery-operated versions of the hazard detectors 904. These hazard detectors 904 are often located in an area without access to constant and reliable (e.g., structural) power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, hazard detectors 904 can send messages that correspond to each of the respective sensors to the other devices and cloud-computing system 964, such as by using the mesh network as described above.

Examples of spokesman nodes include smart doorbells 906, smart thermostats 902, smart wall switches 908, and smart wall plugs 910. These devices 902, 906, 908, and 910 are often located near and connected to a reliable power source, and therefore can include more power-consuming components, such as one or more communication chips capable of bidirectional communication in any variety of protocols.

In some embodiments, the mesh network of low-powered and spokesman nodes can be used to provide exit lighting in the event of an emergency. In some instances, to facilitate this, users provide pre-configuration information that indicates exit routes in the smart-home environment 900. For example, for each room in the house, the user provides a map of the best exit route. It should be appreciated that instead of a user providing this information, cloud-computing system 964 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the hazard detector 904 detects smoke and activates an alarm), cloud-computing system 964 or some other device uses occupancy information obtained from the low-powered and spokesman nodes to determine which rooms are occupied and then turns on lights (e.g., smart nightlights 970, wall switches 908, smart wall plugs 910 that power lamps, etc.) along the exit routes from the occupied rooms so as to provide emergency exit lighting.

Further included and illustrated in the exemplary smart-home environment 900 of FIG. 9 are service robots 962 each configured to carry out, in an autonomous manner, any of a variety of household tasks. For some embodiments, the service robots 962 can be respectively configured to perform floor sweeping, floor washing, etc. in a manner similar to that of known commercially available devices such as the Roomba™ and Scooba™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 962 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized air monitor/purifier for an occupant, a particular service robot 962 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 962 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 962, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 962 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 962 can be advised by other smart-home sensors that the temperature and humidity levels are rising in the kitchen, which is nearby the occupant's current dining room location, and responsive to this advisory, the hazard detector service robot 962 will temporarily raise a hazard detection threshold, such as a smoke detection threshold, under an inference that any small increases in ambient smoke levels will most likely be due to cooking activity and not due to a genuinely hazardous condition.

Figure 10:
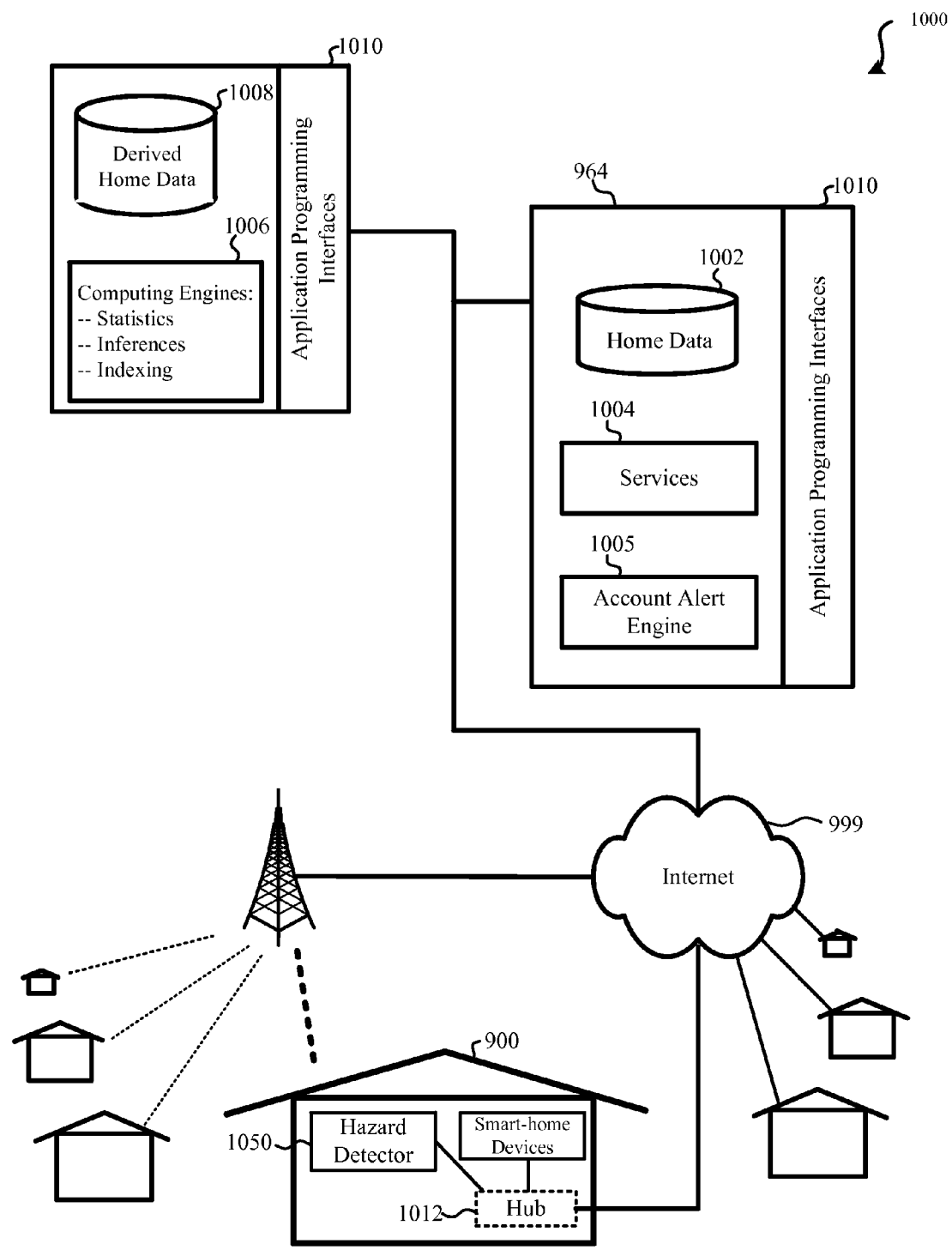
FIG. 10 illustrates a network-level view of the extensible devices and services platform with which a hazard detector may be integrated.

FIG. 10 illustrates a network-level view of an extensible devices and services platform 1000 with which a plurality of smart-home environments, such as the smart-home environment 900 of FIG. 9, can be integrated. Such a platform may be used by a smart-home device for communicating with an aggregation server system. The extensible devices and services platform 1000 includes cloud-computing system 964. Each of the intelligent, network-connected devices 902, 904, 906, 908, 910, 912, 914, and 916 from FIG. 9 may communicate with cloud-computing system 964. For example, a connection to the Internet 999 can be established either directly (for example, using 3G/4G connectivity to a wireless carrier), through a hubbed network 1012 (which can be a scheme ranging from a simple wireless router, for example, up to and including an intelligent, dedicated whole-home control node), or through any combination thereof.

Although in some examples provided herein, the devices and services platform 1000 communicates with and collects data from the smart devices of smart-home environment 900 of FIG. 9, it should be appreciated that the devices and services platform 1000 communicates with and collects data from a plurality of smart-home environments across the world. For example, cloud-computing system 964 can collect home data 1002 from the devices of one or more smart-home environments, where the devices can routinely transmit home data or can transmit home data in specific instances (e.g., when a device queries the home data 1002). Thus, the devices and services platform 1000 routinely collects data from homes across the world. As described, the collected home data 1002 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

Cloud-computing system 964 can further provide one or more services 1004. The services 1004 can include, e.g., software updates, customer support, sensor data collection/logging, remote access, remote or distributed control, or use suggestions (e.g., based on collected home data 1002 to improve performance, reduce utility cost, etc.). Data associated with the services 1004 can be stored at cloud-computing system 964 and cloud-computing system 964 can retrieve and transmit the data at an appropriate time (e.g., at regular intervals, upon receiving a request from a user, etc.).

As part of services 1004, user accounts may be maintained by the cloud-computing system 964. The user account may store subscription information, billing information, registration information, user preferences, and/or other data associated with various smart-home devices, such as one or more hazard detectors, installed within a structure that is linked with a user account. Occasionally, attention of a user to his or her user account may be requested. In response to a query from hazard detector 1050 (or other smart-home device), a message may be transmitted by the cloud-computing system 964 to hazard detector 1050 (which may represent any of the previously described hazard detectors) indicating that a status output by hazard detector 1050 should indicate that a user is requested to log in to his or her user account. Further detail regarding the requested log may be transmitted by service 1004 to hazard detector 1050. For instance, the reason for the requested login may be expired payment information (such as an expired credit card). The user can request detail on a status output by hazard detector 1050, which may be presented to the user as a color and animation output via a light of hazard detector 1050. The request for detail may be by performing a gesture within the vicinity of hazard detector 1050. A spoken message may then be output by hazard detector 1050 indicating that the user is requested to log in to his account and may also indicate the reason of the payment information needing to be updated. As such, a status check performed by hazard detector 1050 may not only check the status of hazard detector 1050 itself, but also the state of a remotely-maintained user account.

As illustrated in FIG. 10, an embodiment of the extensible devices and services platform 1000 includes a processing engine 1006, which can be concentrated at a single server or distributed among several different computing entities without limitation. The processing engine 1006 can include computerized engines (e.g., software executed by hardware) configured to receive data from devices of smart-home environments (e.g., via the Internet or a hubbed network), to index the data, to analyze the data and/or to generate statistics based on the analysis or as part of the analysis. The analyzed data can be stored as derived home data 1008.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 1006 and transmitted. The results or statistics can be provided via the Internet 999. In this manner, the processing engine 1006 can be configured and programmed to derive a variety of useful information from the home data 1002. A single server can include one or more engines.

In some embodiments, to encourage innovation and research and to increase products and services available to users, the devices and services platform 1000 exposes a range of application programming interfaces (APIs) 1010 to third parties, such as charities, governmental entities (e.g., the Food and Drug Administration or the Environmental Protection Agency), academic institutions (e.g., university researchers), businesses (e.g., providing device warranties or service to related equipment, targeting advertisements based on home data), utility companies, and other third parties. The APIs 1010 may be coupled to and permit third-party systems to communicate with cloud-computing system 964, including the services 1004, the processing engine 1006, the home data 1002, and the derived home data 1008. For example, the APIs 1010 allow applications executed by the third parties to initiate specific data processing tasks that are executed by cloud-computing system 964, as well as to receive dynamic updates to the home data 1002 and the derived home data 1008.

Account alert engine may serve to determine whether a hazard detector should provide an indication that the user's account requires attention. For instance, account alert engine 1005 may periodically assess the state of a user's account, such as whether settings need updating, whether payment information is up-to-date, whether one or more messages are pending, whether payment is due, etc. If user attention is required, upon a request being received from a hazard detector and a look-up of the user's account being performed, account alert engine may respond with an indication that the user account requires attention. Additional detail may also be provided such that if the user performs a gesture or otherwise requests additional detail, such detail can be provided, such as via an auditory message. If user attention is not required, upon a request being received from a hazard detector and a look-up of the user's account being performed (e.g., by determining an account associated with the hazard detector from which the request was received), account alert engine may respond with an indication that the user account does not require attention.

FIG. 1100 illustrates an abstracted functional view of the extensible devices and services platform 1000 of FIG. 10, with particular reference to the processing engine 1006 as well as devices, such as those of the smart-home environment 900 of FIG. 9. Even though devices situated in smart-home environments will have an endless variety of different individual capabilities and limitations, they can all be thought of as sharing common characteristics in that each of them is a data consumer 1165 (DC), a data source 1166 (DS), a services consumer 1167 (SC), and a services source 1168 (SS). Advantageously, in addition to providing the essential control information needed for the devices to achieve their local and immediate objectives, the extensible devices and services platform 1000 can also be configured to harness the large amount of data that is flowing out of these devices. In addition to enhancing or optimizing the actual operation of the devices themselves with respect to their immediate functions, the extensible devices and services platform 1000 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

Figure 11:
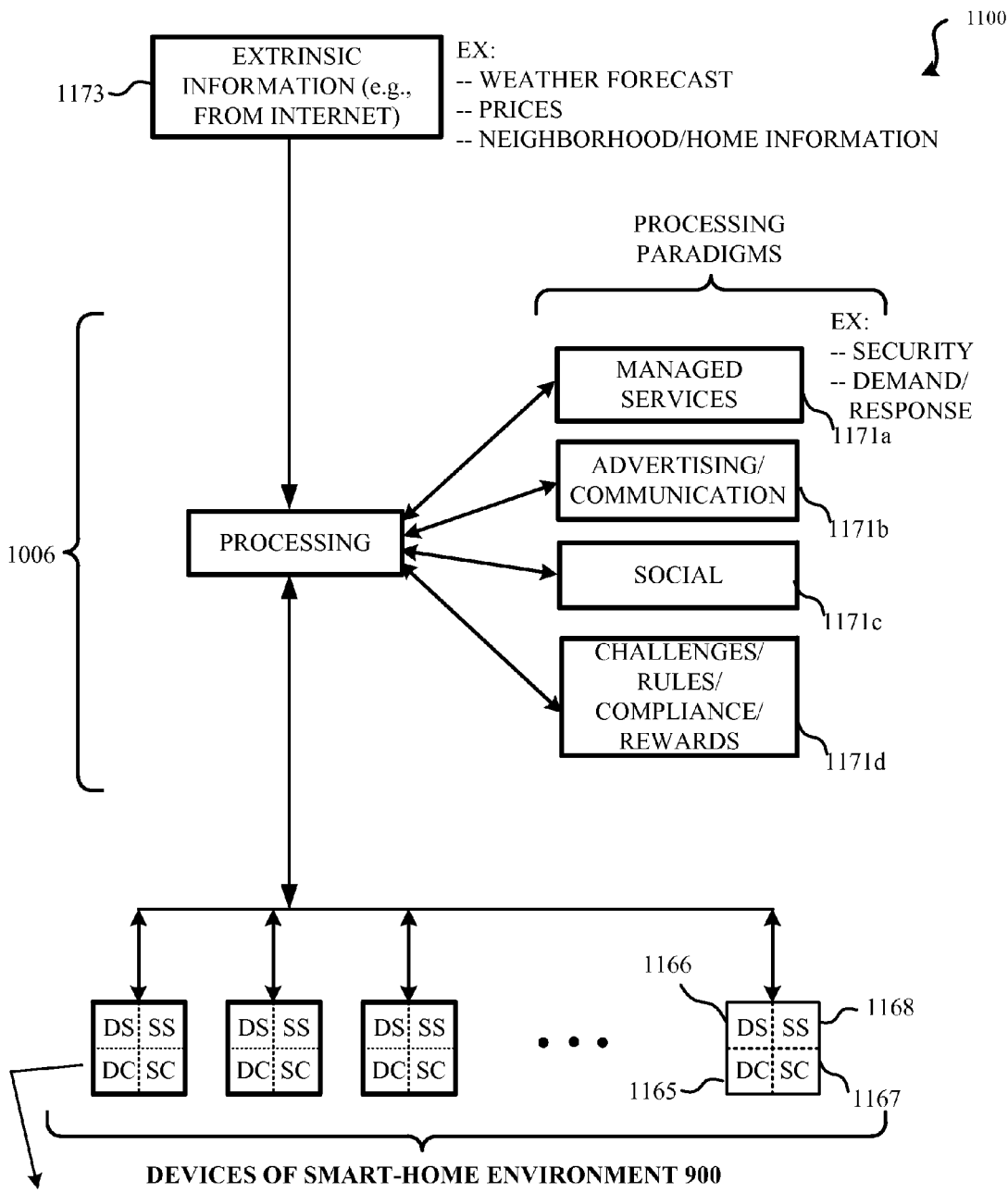
FIG. 11 illustrates an embodiment of an abstracted functional view of the extensible devices and services platform of FIG. 10, with reference to a processing engine as well as devices of the smart-home environment.

For example, FIG. 11 shows processing engine 1006 as including a number of paradigms 1171. Processing engine 1006 can include a managed services paradigm 1171a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 1006 can further include an advertising/communication paradigm 1171b that estimates characteristics (e.g., demographic information), desires and/or products of interest of a user based on device usage. Services, promotions, products or upgrades can then be offered or automatically provided to the user. Processing engine 1006 can further include a social paradigm 1171c that uses information from a social network, provides information to a social network (for example, based on device usage), and/or processes data associated with user and/or device interactions with the social network platform. For example, a user's status as reported to his trusted contacts on the social network could be updated to indicate when he is home based on light detection, security system inactivation or device usage detectors. As another example, a user may be able to share device-usage statistics with other users. In yet another example, a user may share HVAC settings that result in low power bills and other users may download the HVAC settings to their smart thermostat 802 to reduce their power bills.

The processing engine 1006 can include a challenges/rules/compliance/rewards paradigm 1171d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 1006 can integrate or otherwise utilize extrinsic information 1173 from extrinsic sources to improve the functioning of one or more processing paradigms. Extrinsic information 1173 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 1000, ranging from the ordinary to the profound. Thus, in one "ordinary" example, each bedroom of the smart-home environment 900 can be provided with a smart wall switch 908, a smart wall plug 910, and/or smart hazard detectors 904, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 1006 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Figure 12:
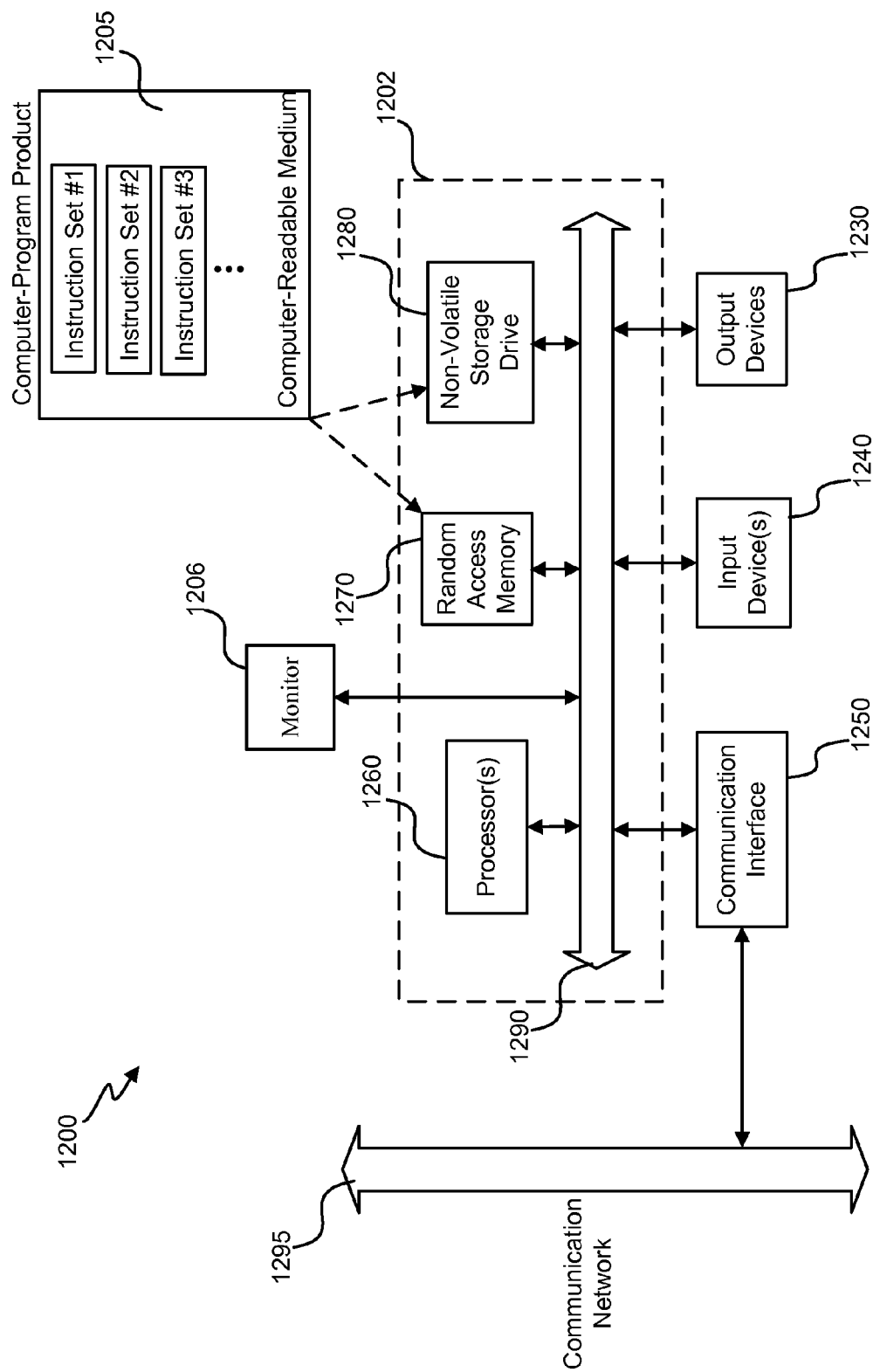
FIG. 12 illustrates an embodiment of a computer system.

With reference to FIG. 12, an embodiment of a special-purpose computer system 1200 is shown. For example, one or more intelligent components, processing system 110 and components thereof may be a special-purpose computer system 1200. Computer system 1200 may be used as part of smart-home device 100, thermostat 200, and/or aggregation server system 400. Such a special-purpose computer system 1200 may be incorporated as part of a hazard detector and/or any of the other computerized devices discussed herein, such as a remote server, smart thermostat, or network. The above methods may be implemented by computer-program products that direct a computer system to perform the actions of the above-described methods and components. Each such computer-program product may comprise sets of instructions (codes) embodied on a computer-readable medium that direct the processor of a computer system to perform corresponding actions. The instructions may be configured to run in sequential order, or in parallel (such as under different processing threads), or in a combination thereof. After loading the computer-program products on a general purpose computer system 1226, it is transformed into the special-purpose computer system 1200.

Special-purpose computer system 1200 comprises a computer 1202, a monitor 1206 coupled to computer 1202, one or more additional user output devices 1230 (optional) coupled to computer 1202, one or more user input devices 1240 (e.g., keyboard, mouse, track ball, touch screen) coupled to computer 1202, a communications interface 1250 coupled to computer 1202, a computer-program product 1205 stored in a tangible computer-readable memory in computer 1202. Computer-program product 1205 directs computer system 1200 to perform the above-described methods. Computer 1202 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1202 and loaded into random access memory (RAM) 1270. Each processor 1260 may comprise a microprocessor, such as a microprocessor from Intel® or Advanced Micro Devices, Inc.®, or the like. To support computer-program product 1205, the computer 1202 runs an operating system that handles the communications of computer-program product 1205 with the above-noted components, as well as the communications between the above-noted components in support of the computer-program product 1205. Exemplary operating systems include Windows® or the like from Microsoft Corporation, Solaris® from Sun Microsystems, LINUX, UNIX, and the like.

User input devices 1240 include all possible types of devices and mechanisms to input information to computer 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1206 via a command such as a click of a button or the like. User output devices 1230 include all possible types of devices and mechanisms to output information from computer 1202. These may include a display (e.g., monitor 1206), printers, non-visual displays such as audio output devices, etc.

Communications interface 1250 provides an interface to other communication networks, such as communication network 1295, and devices and may serve as an interface to receive data from and transmit data to other systems, WANs and/or the Internet. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1202, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1202 to communicate with each other as intended. Although bus subsystem 1290 is shown schematically as a single bus, alternative embodiments of the bus subsystem may utilize multiple busses or communication paths within the computer 1202.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A smart-home device, comprising:
   a sensor selected from the group consisting of: a temperature sensor, a smoke sensor, a carbon monoxide sensor, ambient light sensor, and an occupancy sensor;
   a power supply interface that receives power from a structure's wired electrical system;
   a battery-based power supply configured to charge, using the power supply interface and provide power to the smart-home device when the structure's wired electrical system is not powered; and
   a processing system, the processing system being in communication with the power supply interface, the processing system comprising at least one processor and being configured to:
      determine that the power supply interface has ceased receiving power from the structure's wired electrical system;
      in response to determining that the power supply interface has ceased receiving power from the structure's wired electrical system: transmit a query to one or more other smart-home devices that are connected with the structure's wired electrical system;
      determine that the structure has lost power based on one or more responses from the other smart-home devices, one or more non-responses from the other smart-home devices, or a combination of responses and non-responses from the other smart-home devices;
      in response to determining that the structure has lost power, store a power loss indication that comprises a timestamp;
      determine that a network connection is available; and
      transmit a notification comprising information from the stored power loss indication to a remote server via the available network connection, wherein the smart-home device is either a thermostat, a smoke detector, a carbon monoxide detector, an entryway interface device, or security system device.

2. The smart-home device of claim 1, wherein the smart-home device is located in a first structure and the processing system being configured to determine that the network connection is available comprises the processing system being configured to:
   query a second smart-home device located in a second house distinct from the first structure, wherein the first structure is a first house distinct from the second house; and
   in response to the query, receive an indication that the second smart-home device has the available network connection.

3. The smart-home device of claim 2, wherein the smart-home device is a thermostat, the sensor is the smoke sensor, and the second smart-home device is a smoke detector.

4. The smart-home device of claim 1, wherein the processing system being configured to determine that the network connection is available comprises the processing system being configured to:
   establish a wireless connection with a cellular phone that is connected with a cellular network.

5. The smart-home device of claim 1, wherein:
   the sensor is the temperature sensor, wherein the smart-home device is the thermostat that controls an HVAC system.

6. The smart-home device of claim 1, wherein the processing system is further configured to:
   determine artificial lighting in an ambient environment of the smart-home device has transitioned from on to off within a threshold time period of the power supply interface having ceased to receive power from the structure's wired electrical system, wherein the processing system being configured to store the power loss indication that comprises the timestamp comprises the processing system being configured to:
      store the power loss indication that comprises the timestamp in response to determining that the power supply interface has ceased receiving power from the structure's wired electrical system and the determining the artificial lighting in the ambient environment of the smart-home device has transitioned from on to off.

7. The smart-home device of claim 1, wherein the processing system is further configured to:
   determine that the power supply interface has ceased receiving power from the structure's wired electrical system for at least a threshold period of time, wherein the processing system being configured to store the power loss indication that comprises the timestamp comprises the processing system being configured to:
      store the power loss indication that comprises the timestamp in response to determining that the power supply interface has ceased receiving power from the structure's wired electrical system for at least the threshold period of time.

8. A smart-home device data aggregation system comprising:
   one or more processors; and
   a memory communicatively coupled with and readable by the one or more processors and having stored therein processor-readable instructions which, when executed by the one or more processors, cause the one or more processors to:
      receive a plurality of power loss notifications from a plurality of smart-home devices, wherein each smart-home device of the plurality of smart-home devices is located in a different structure and the plurality of power loss notifications comprises a plurality of timestamps corresponding to times at which power loss was detected by the plurality of smart-home devices;

identify a plurality of locations corresponding to the plurality of smart-home devices from which the plurality of power loss notifications were received;

identify a power outage cluster based on the plurality of locations and the plurality of timestamps;

determine a utility service provider associated with a geographic region of the power outage cluster;

transmit a notification to the utility service provider indicative of a power outage and the geographic region of the power outage cluster;

create a schedule for reinitiating electrical HVAC functions for the plurality of smart-home devices, wherein the schedule defines staggered start times for electrical HVAC functions for the plurality of smart-home devices; and transmit, to each smart-home device of the plurality of smart-home devices, a timing indication at which electrical HVAC functions are eligible to be reinitiated, wherein the timing indication indicates a time.

9. The smart-home device data aggregation system of claim 8, wherein the processor-readable instructions that cause the one or more processors to identify the power outage cluster based on the plurality of locations and the plurality of timestamps comprise processor-readable instructions that, when executed, cause the one or more processors to:

determine the power outage cluster using a threshold time difference and a threshold distance difference for determining whether the plurality of power loss notifications are associated with a power loss event.

10. The smart-home device data aggregation system of claim 8, wherein the processor-readable instructions that cause the one or more processors to identify the power outage cluster based on the plurality of locations and the plurality of timestamps comprise processor-readable instructions that, when executed, cause the one or more processors to:

analyze an electrical grid mapping to determine the plurality of smart-home devices are connected with a common electrical grid.

11. The smart-home device data aggregation system of claim 8, further comprising:

the plurality of smart-home devices, each smart-home device being configured to:
  receive the timing indication at which an electrical HVAC system is eligible to be reinitiated; and
  restart the electrical HVAC system based on the timing indication.

12. The smart-home device data aggregation system of claim 11, wherein the electrical HVAC system is selected from the group consisting of:

an electric heating source; and
an air conditioner.

13. The smart-home device data aggregation system of claim 8, wherein the processor-readable instructions which, when executed by the one or more processors, further cause the one or more processors to:

collect social media data indicative of the power outage;
identify a location associated with the social media data, wherein the processor-readable instructions that cause the one or more processors to identify the power outage cluster based on the plurality of locations and the plurality of timestamps comprise processor-readable instructions that, when executed, cause the one or more processors to:

identify the power outage cluster based on the plurality of locations, the plurality of timestamps, and the location associated with the social media data.

14. A method for handling a power outage, comprising:

determining, by a smart-home device, that a power supply interface of the smart-home device has ceased receiving power from a structure's wired electrical system, wherein the smart-home device is either a thermostat, a smoke detector, a carbon monoxide detector, an entryway interface device, or security system device;

in response to determining that the power supply interface has ceased receiving power from the structure's wired electrical system: transmit a query to one or more other smart-home devices that are connected with the structure's wired electrical system;

determining, by the smart-home device, that the structure has lost power based on one or more responses from the other smart-home devices, one or more non-responses from the other smart-home devices, or a combination of responses and non-responses from the other smart-home devices;

storing, by the smart-home device a power loss indication that comprises a timestamp in response to determining that the structure has lost power in response to determining that the structure has lost power;

determining, by the smart-home device, that a network connection is available; and transmitting, by the smart-home device, a notification comprising information from the stored power loss indication to a remote server via the available network connection.

15. The method for handling the power outage of claim 14, the method further comprising:

querying, by the smart-home device, a second smart-home device located in a second house distinct from a first house in which the smart-home device is located; and in response to querying, receiving, by the smart-home device, an indication that the second smart-home device located in the second house has the available network connection.

16. The method for handling the power outage of claim 14, the method further comprising:

determining, by the smart-home device, artificial lighting in an ambient environment of the smart-home device has transitioned from on to off within a threshold time period of the power supply interface having ceased to receive power from the structure's wired electrical system, wherein storing the power loss indication that comprises the timestamp comprises:

storing, by the smart-home device, the power loss indication that comprises the timestamp in response to determining that the power supply interface has ceased receiving power from the structure's wired electrical system and the determining the artificial lighting in the ambient environment of the smart-home device has transitioned from on to off.

17. The method for handling the power outage of claim 14, the method further comprising:

determining, by the smart-home device, that the power supply interface has ceased receiving power from the structure's wired electrical system for at least a threshold period of time, wherein storing, by the smart-home device, the power loss indication that comprises the timestamp comprises:

storing, by the smart-home device, the power loss indication that comprises the timestamp in response to determining that the power supply interface has ceased receiving power from the structure's wired electrical system for at least the threshold period of time.

* * * * *